US00RE39242E

(19) United States
(12) Reissued Patent
Johnson et al.

(10) Patent Number: US RE39,242 E
(45) Date of Reissued Patent: Aug. 22, 2006

(54) WET WIPING PRINTHEAD CLEANING SYSTEM USING A NON-CONTACT TECHNIQUE FOR APPLYING A PRINTHEAD TREATMENT FLUID

(75) Inventors: Eric Joseph Johnson, Sacramento, CA (US); Eric Mattis, San Diego, CA (US); Donald L. Michael, Monmouth, OR (US)

(73) Assignee: Hewlett-Packard Development Company, L.P., Houston, TX (US)

(21) Appl. No.: 09/863,467

(22) Filed: May 22, 2001

Related U.S. Patent Documents

Reissue of:
(64) Patent No.: 5,907,335
Issued: May 25, 1999
Appl. No.: 08/747,883
Filed: Nov. 13, 1996

(51) Int. Cl.
*B41J 2/165* (2006.01)

(52) U.S. Cl. ..... 347/28; 347/32; 347/33

(58) Field of Classification Search ..... 347/28, 347/21, 23, 32, 33, 22, 31; 400/701; 101/425; 15/256.5
See application file for complete search history.

(56) References Cited

U.S. PATENT DOCUMENTS

| | | | | | |
|---|---|---|---|---|---|
| 4,050,078 | A | * | 9/1977 | Isayama et al. | 347/28 |
| 4,296,418 | A | | 10/1981 | Yamazaki et al. | |
| 4,306,245 | A | * | 12/1981 | Kasugayama et al. | 347/33 |
| 4,734,718 | A | | 3/1988 | Iwagami | |
| 5,051,758 | A | | 9/1991 | Markham | 347/28 |
| 5,300,958 | A | * | 4/1994 | Burke et al. | 347/28 |
| 5,339,098 | A | * | 8/1994 | Nagatomo et al. | 347/5 |
| 5,396,271 | A | * | 3/1995 | Premnath | 347/33 |
| 5,495,272 | A | | 2/1996 | Yamaguchi | 347/28 |
| 5,500,659 | A | * | 3/1996 | Curran, Jr. et al. | 347/28 |
| 5,552,811 | A | * | 9/1996 | Kurata et al. | 347/28 |
| 5,635,965 | A | * | 6/1997 | Purwins et al. | 347/31 |
| 5,706,038 | A | * | 1/1998 | Jackson et al. | 347/33 |
| 6,158,838 | A | | 12/2000 | Capurso | 347/28 |

FOREIGN PATENT DOCUMENTS

| | | | | |
|---|---|---|---|---|
| EP | 0 465 260 A2 | * | 1/1992 | |
| EP | 0 513 833 A2 | * | 11/1992 | |
| EP | 0 671272 A2 | * | 9/1995 | |
| EP | 0 714 775 A3 | | 6/1996 | |
| GB | 2055328 | | 3/1981 | |
| JP | 54-133335 | * | 10/1979 | 347/28 |
| JP | 59-14693 | * | 1/1984 | |
| JP | 59-14962 | * | 1/1984 | |
| JP | 59-45162 | * | 3/1984 | |
| JP | 59-45163 | * | 3/1984 | |
| JP | 59-209876 | * | 11/1984 | |
| JP | 2-202452 | * | 8/1990 | |
| JP | 3-90362 | * | 4/1991 | |
| JP | 3-99857 | * | 4/1991 | |
| JP | 4-37556 | * | 2/1992 | |
| JP | 4-307256 | | 10/1992 | |
| JP | 4-338552 | * | 11/1992 | |
| JP | 5-162320 | * | 6/1993 | |
| JP | 6-234221 | * | 8/1994 | |
| WO | WO 89/03769 | | 5/1989 | |

* cited by examiner

*Primary Examiner*—Shih-wen Hsieh

(57) ABSTRACT

A wet-wiping printhead cleaning system including a treatment fluid applicator placing treatment fluid on at least one of two elements involved in wiping, said two elements being a printhead orifice plate surface and a wiper, the system being so configured that treatment fluid is applied before wiping the printhead by projecting treatment fluid onto at least one element through the atmosphere, thereby avoiding direct contact between the applicator and said one element, the treatment fluid being placed so as to be available to assist in wiping a portion of the printhead orifice plate where the nozzle orifices are located to remove debris that may have accumulated, the treatment fluid lubricating the wiper so as to lengthen wiper service life and enhance wiping performance, as well as acting to render such accumulations more removable by wiping, the source of treatment fluid being uncontaminated by contact with either the printhead or the wiper.

22 Claims, 21 Drawing Sheets

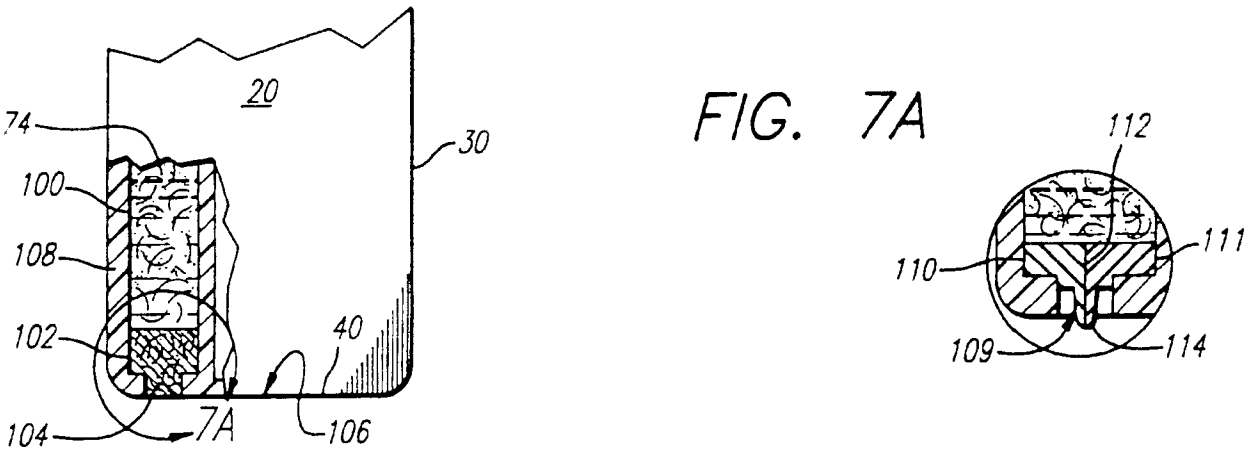
FIG. 7
FIG. 7A
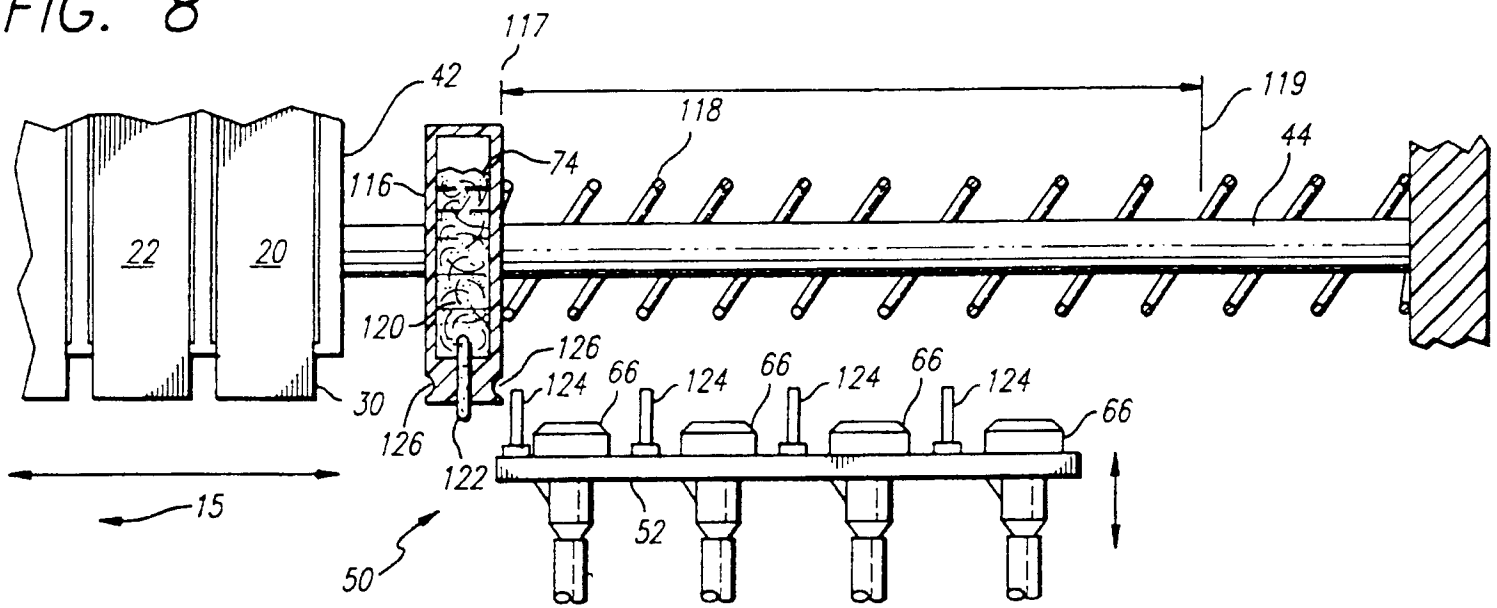
FIG. 8

FIG. 31
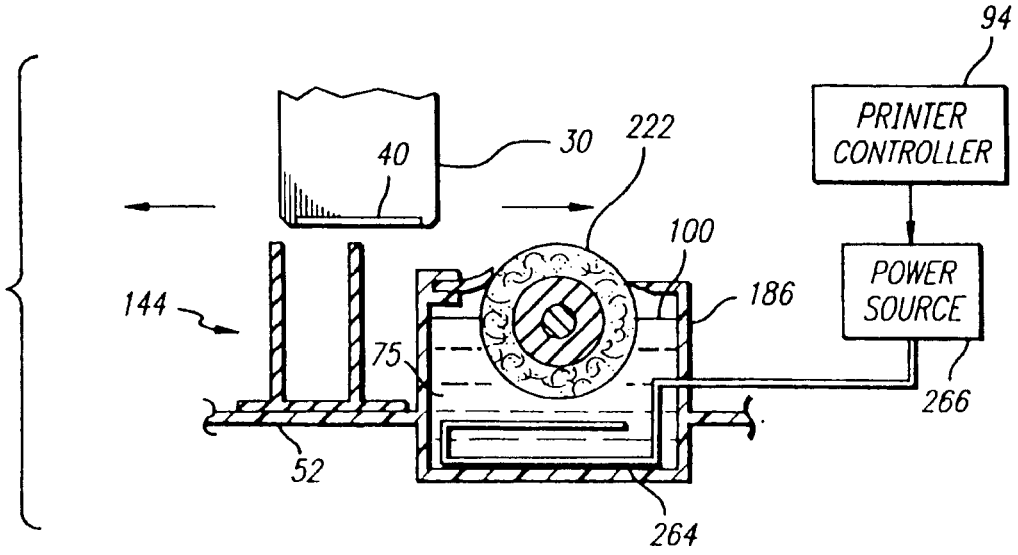
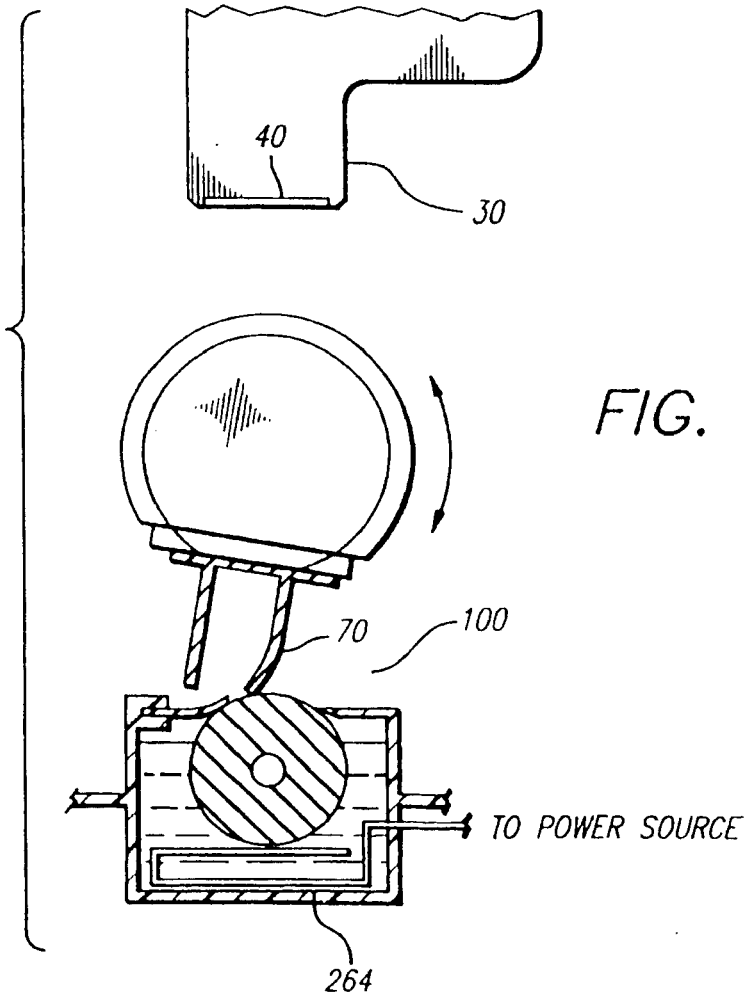
FIG. 32

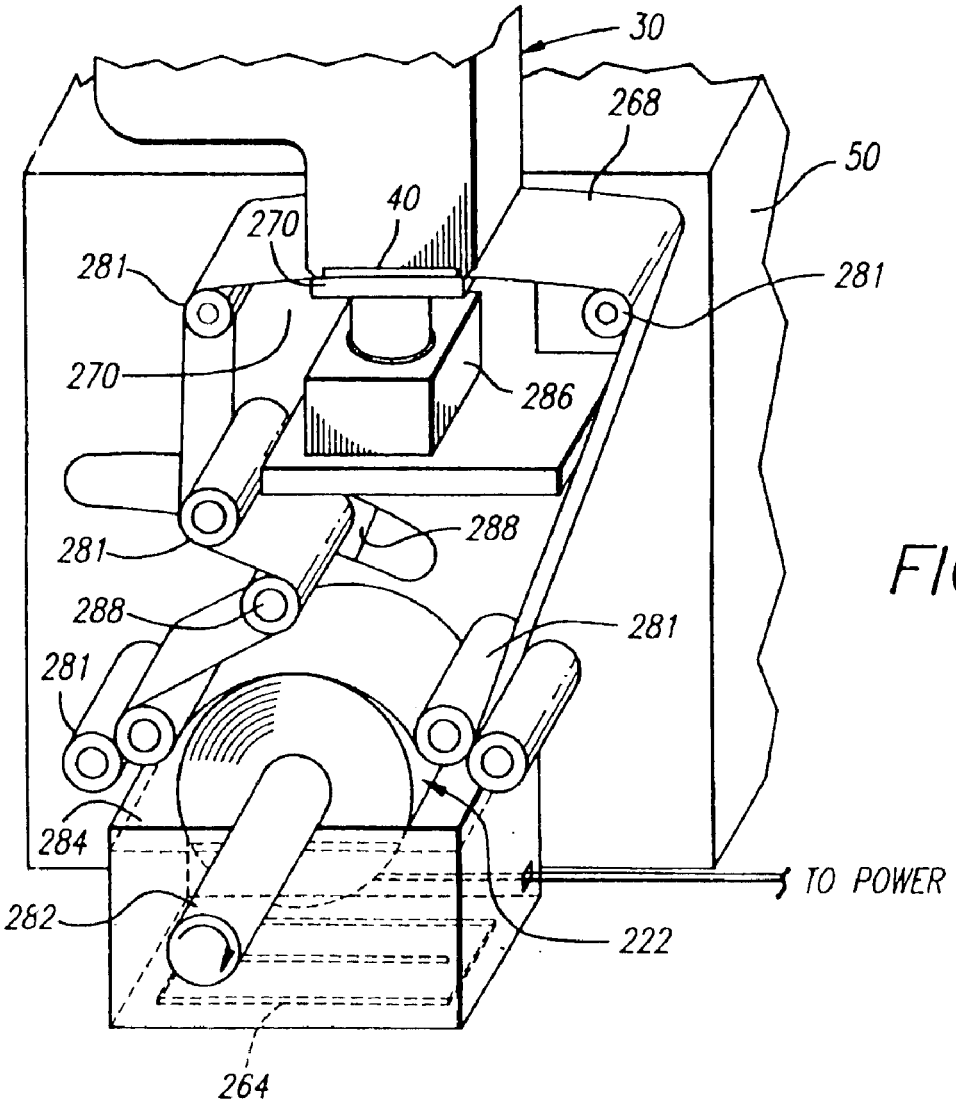
FIG. 35
FIG. 36
(Amended)
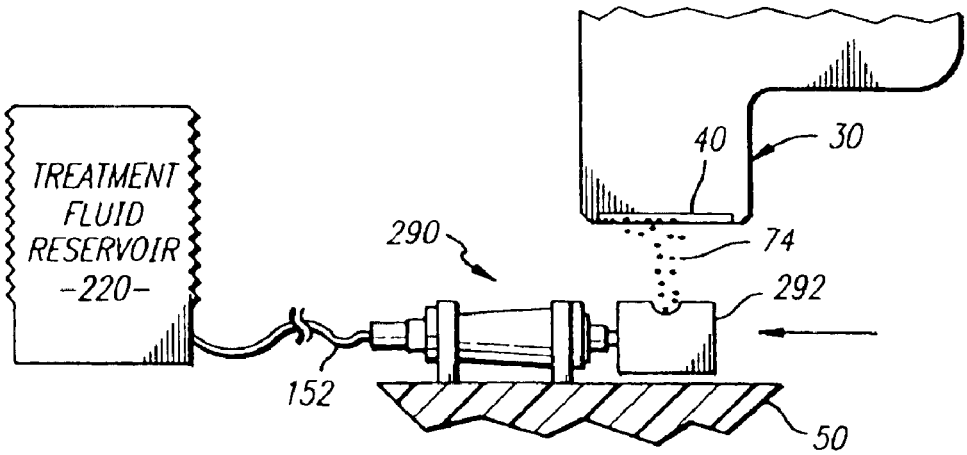

FIG. 37
(Amended)
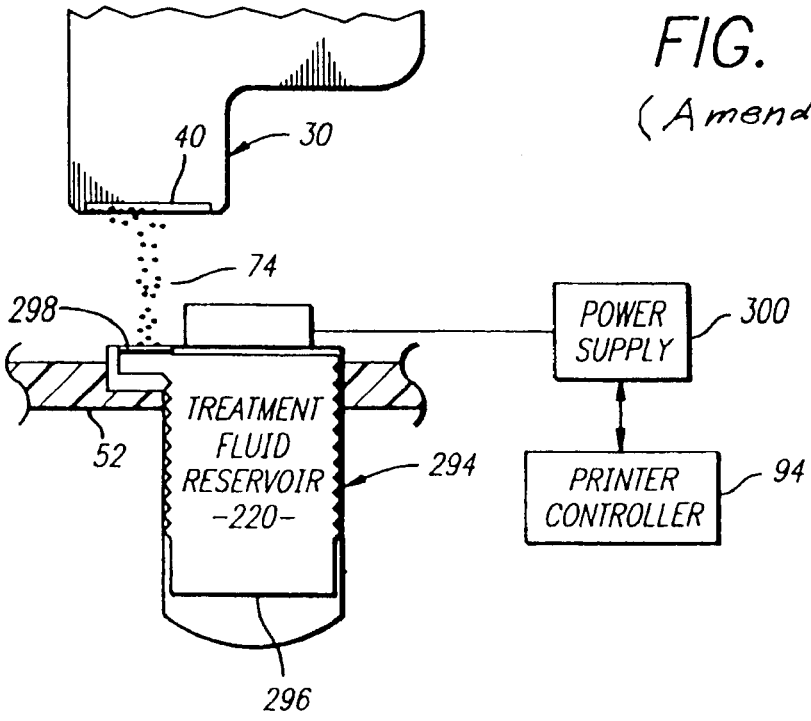
FIG. 38
(Amended)
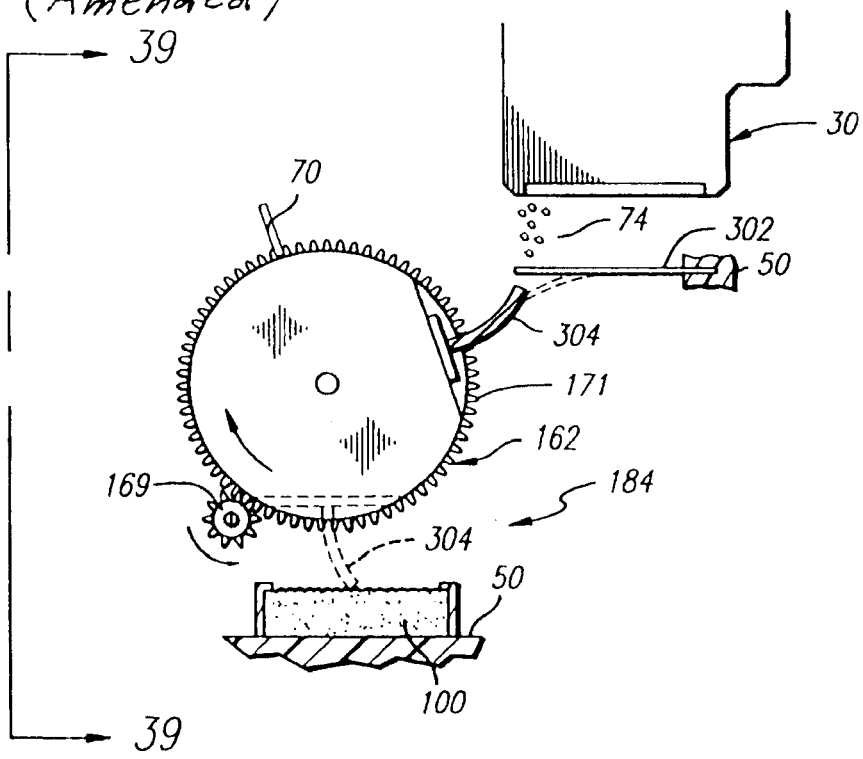

FIG. 40
(Amended)
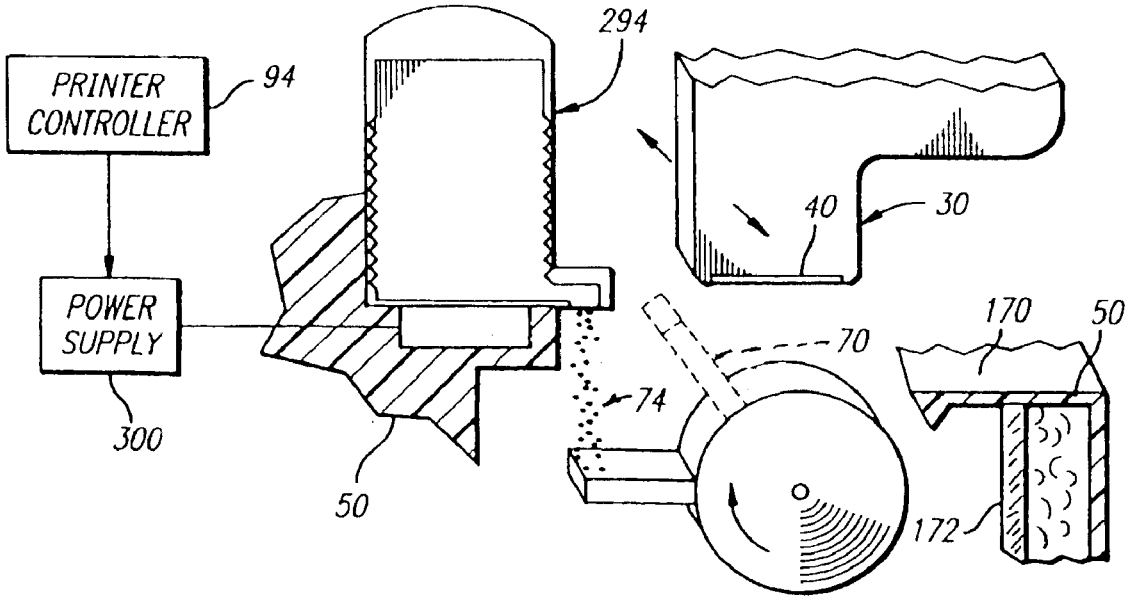

WET WIPING PRINTHEAD CLEANING SYSTEM USING A NON-CONTACT TECHNIQUE FOR APPLYING A PRINTHEAD TREATMENT FLUID

Matter enclosed in heavy brackets [ ] appears in the original patent but forms no part of this reissue specification; matter printed in italics indicates the additions made by reissue.

RELATED APPLICATIONS

This application is related to three other co-owned applications filed concurrently herewith, namely: U.S. patent application Ser. No. 08/747,855, filed on Nov. 13, 1996 entitled WET-WIPING PRINTHEAD CLEANING SYSTEM USING A TRANSFER ELEMENT, HP Docket No. 10961139; U.S. patent application Ser. No. 08/747,884, filed on Nov. 16, 1998 entitled WET-WIPING PRINTHEAD CLEANING SYSTEM USING A PRINTHEAD TREATMENT FLUID STORED IN A NON-FLOWABLE STATE, HP Docket No. 10961134; and U.S. patent application Ser. No. 08/747,857, filed on Nov. 13, 1996 entitled WET-WIPING PRINTHEAD CLEANING SYSTEM USING A DIRECT CONTACT TECHNIQUE, HP Docket No. 10961133.

BACKGROUND OF THE INVENTION

1. Field of the Invention

The present invention relates to the cleaning of printheads in computer-driven printers of the type generally known as inkjet printers. More particularly, the invention relates to such cleaning in printers employing a "wiper" which slidingly engages and wipes a nozzle orifice plate surface of a printhead to remove excess ink and accumulated debris to improve printhead performance and print quality.

2. Description of the Related Art

Ink-jet printing systems typically operate by ejecting ink from a plurality of small, closely-spaced nozzles located on the printhead. For proper functioning, an ink-jet printhead must be routinely serviced.

During printing, stray droplets of ink, dust, paper fibers and other debris can accumulate around the nozzles on the orifice plate surface and interfere with the trajectory of subsequently ejected ink droplets, thereby affecting print quality. To minimize this, the ink-jet printhead can be cleaned by intermittently wiping the orifice plate surface to remove the accumulated ink and debris.

During periods of inactivity, ink in the nozzles can dry or harden, plugging the nozzles. Thus, ink-jet printheads may be capped to maintain an appropriate environment around the nozzles and to postpone their clogging. This capping may be done automatically after a short period of inactivity, even during the middle of printing a page, if the printer is waiting for more data.

Inkjet printers generally have a printhead service station to which an inkjet printhead is moved by carriage, and a cap which sealingly contacts the printhead is generally located at the service station. At the service station, the printhead (or multiple heads if such are used) are occasionally cleaned and, if necessary, primed with ink. For use in this cleaning function wipers are located at the service station. The service station can include a "sled" carrying these elements and others required to service the one or more printheads of the printer. This sled itself can be moved transversely to an axis of motion of the printhead carriage, for example in a vertical direction, so as to bring the caps or wipers for example into or out of contact with the printhead. Alternatively, a tumbler can be provided at the service station, and wipers, as well as caps, can be located on the tumbler. Rotation (and in some cases also vertical movement) of the tumbler effects wiping of the printhead, and/or alignment of one or more caps with one or more printheads positioned adjacent the tumbler at the service station.

To improve printing speed and the clarity and contrast of the printed image, recent advancements in the art have focused on improving the ink itself. For example, to provide faster, more waterfast printing with darker blacks and more vivid colors, improved pigment-based inks for inkjet applications have been developed. These pigment-based inks have a higher suspended solids content than earlier dye-based inks. Both types of ink dry quickly, which allows inkjet printing mechanisms to use plain paper. However, the combination of small nozzles and quick-drying ink leaves the printheads susceptible to clogging, in this case not only from the dried ink and minute dust particles or paper fibers, but also from the solids within the inks themselves. Further, this dried ink is more difficult to remove the previously used dry-based inks when dried. These characteristics compound the problems affecting print quality mentioned above.

Another characteristic of these pigment-based inks contributes to the nozzle clogging problem. The pigment-based inks use a dispersant to keep the pigment particles from flocculating. Unfortunately, the dispersant tens to form a tough film on the printhead orifice plate face as the ink "vehicle" or carrier component of the pigment-based ink evaporates. Besides the debris accumulated on the printhead face from ink over-spray, paper crashes and printer printing for example, this dispersant film also attracts and binds paper dust and other contaminants as well as solid from the ink itself. It has been recognized that this film, as well as ink residue and debris surrounding the printhead nozzles, is quite difficult to removed from the printhead.

Known cleaning systems used in printers of this type employ wipers which incorporate a blade formed of an elastomeric material such as a vinyl or EDPM. The wiper blade and a printhead are moved relative to one another so that the blade wipes accumulation from the critical area of the printhead incorporating the nozzle orifices. This system is not always fully effective even with older, dye-based inks. Some systems employ a second wiper formed of a soft absorbent material to further clean or "buff" the printhead. In other printhead servicing systems ink from the pen is ejected or drawn out and used to help lubricate the wiper and dissolve ink residues adhering to the printhead, with the goal of improving cleaning effectiveness. While this later scheme works well with some dye-based ink systems, it involves wasting ink that would otherwise be used for printing. Such a system is disclosed in commonly-owned U.S. Pat. No. 5,103,244 issued Apr. 7, 1992 to Gast, et al. and U.S. patent application Ser. No. 398,709 filed Mar. 6, 1995, the disclosures of which are incorporated herein by reference.

Furthermore, cleaning systems using ink drawn from the printhead do not work as well, generally speaking, with high-solids waterfast ink formulations. Reasons for this include the dried residue from such inks being more resistant to breakup and removably mechanical forces applied by the wiper as mentioned above, and that the kinetics of redissolution are slow in these inks. These factors, for example, limit the effectiveness of this known cleaning process, and that is undesirable. Also, with this system more ink residue collects on the wiper, and some of these accumulations can be pushed back into the nozzles of the printhead which can at least temporarily cause one or more nozzles not to fire properly, degrading print quality.

It has been recognized that application of a fluid solvent or other treatment fluid to the printhead will mitigate the problem of dried ink by showing the drying of ink or redissolving ink residues, rendering the printhead easily cleanable by wiping. However, many problems associated with use of a treatment fluid have been identified.

Storage of the treatment fluid in adequate amounts for the life of the printer without leaking is problematic. For example leaks can occur due to tipping the printer and pressure differentials due to a charge in temperature or altitude during shipment. Another problem recognized is application of treatment fluid to a printhead having undesirable accumulation of ink solids, dispersants, and other debris without contamination of the source of treatment fluid by such accumulations. It is desirable to maintain the means of applying treatment fluid and the treatment fluid itself in an uncontaminated state to provide consisting printhead cleaning over the life of the printer. Also, metering the amount of treatment fluid applied in wiping is recognized as important. Consistent optimally cleaning effectiveness as well as print quality can be compromised by application of too little or too much treatment fluid. Too little treatment fluid results in less effective residue removal allowing undesirable accumulation. Too much treatment fluid can result in one or more nozzles being at least temporarily disabled due to excess treatment fluid being pushed into the nozzle by the wiper, or drawn into the nozzle by negative pressure associated with operation.

In sum there are many problems, including identifying optimal ways of applying treatment fluid to enhance wiping effectiveness, that have been identified but not resolved in known cleaning systems. It is therefore recognized that an improved cleaning system, particularly for printers using pigment-based inks employing high solids content and dispersants, is needed to provide and maintain optimal functioning of thermal inkjet printheads.

SUMMARY OF THE INVENTION

The present invention accordingly provides a system for servicing a portion of a printhead of an inkjet printer of the type having a printhead reciprocally moved by a carriage and a wiper positioned and adapted to move relative to the printhead in wiping contact therewith to remove unwanted accumulations from a portion of the printhead to be cleaned when the printhead and the wiper are moved relative to each other by movement of at least one of the two elements consisting of the printhead and the wiper. The system includes a source of printhead wiping treatment fluid. It also includes projecting treatment fluid through the atmosphere in a reproducible quantity from the source of treatment fluid onto at least one of the said two elements (printhead and wiper) so as to be available to assist in wiping. The system provides for wiping the printhead by relatively moving the wiper and the printhead subsequent to placing the treatment fluid on at least one of these elements.

In a further more detailed aspect, the invention further includes providing an applicator adapted to place treatment fluid in a reproducible quantity on the surface of at least one of the printhead and wiper elements by projecting the treatment fluid through the atmosphere onto at least one of the printhead and wiper elements, avoiding direct contact therewith. Additional steps include transporting treatment fluid from the source of printhead treatment fluid to the applicator and projecting treatment fluid onto at least one element. The source of printhead treatment fluid can be permanently located or replaceable.

In more detail the invention further includes the option of providing a source of treatment fluid that acts both as a treatment fluid reservoir and as an applicator. The source of treatment fluid can incorporate a treatment fluid-jetting apparatus employing on demand drop ejection technology, and projecting jettable treatment fluid therefrom towards at least one element of the two elements consisting of the printhead and the wiper. Such a fluid jetting apparatus can be a cartridge having therein a treatment fluid reservoir and an on demand drop ejection means for projecting treatment fluid, and such a cartridge can be replaceable. Accordingly, in another more specific aspect the source of treatment fluid can be either permanently located within the printer or it can be a replaceable component.

In another detailed aspect the apparatus for projecting treatment fluid can comprise a low-volume spray pump. Such a spray pump can be connected by a conduit to a treatment fluid reservoir. The pump can be actuated by an actuator controlled by the printer controller or actuated by movement of structure carrying the element to which treatment fluid is applied, being the carriage, a service station tumbler or sled, or by movement of other structure coordinated with movement of the printhead or wiper.

In a further more detailed aspect, the apparatus for projecting treatment fluid through the atmosphere can include a spring which is elastically deformed and is adapted to impart energy to the treatment fluid or structure coupled to treatment fluid so as to impel treatment fluid toward at least one of the printhead and wiper elements on rebound of the spring.

BRIEF DESCRIPTION OF THE DRAWINGS

FIG. 7 is a elevation view, partially in break-away section, of a pen according to an alternate embodiment of the invention.

FIG. 7A is a sectional elevation view of a portion of the pen shown in FIG. 7 illustrating further alternate embodiment of the invention.

FIG. 8 is a elevation view, partially in section, of a service station area of an alternate embodiment of the invention.

FIG. 31 is a schematic representation, partially in section, of an alternate embodiment of the invention incorporated i the printer of FIG. 1.

FIG. 32 is a schematic representation, partially in section, of an alternate embodiment of the invention incorporated in the printer of FIG. 15.

FIG. 35 is a schematic perspective illustration of the alternate embodiment of the invention.

FIG. 36 is a schematic illustration of another embodiment of the invention.

FIG. 37 is a schematic illustration of another embodiment of the invention.

FIG. 38 is an elevational schematic representation partially in section, of an alternate embodiment of the invention representation taken from direction line 38—38 in FIG. 39.

FIG. 40 is a perspective representation, partially in section, of a alternate embodiment of the invention.

Certain reference numbers are used to refer to certain like elements in the various embodiments shown in the figures. However, this is purely for convenience. Use of the same or different reference numbers for any element is not to be construed as limiting the invention, or to imply elements are in all ways the same or different.

DESCRIPTION OF THE PREFERRED EMBODIMENTS

Figure 1:
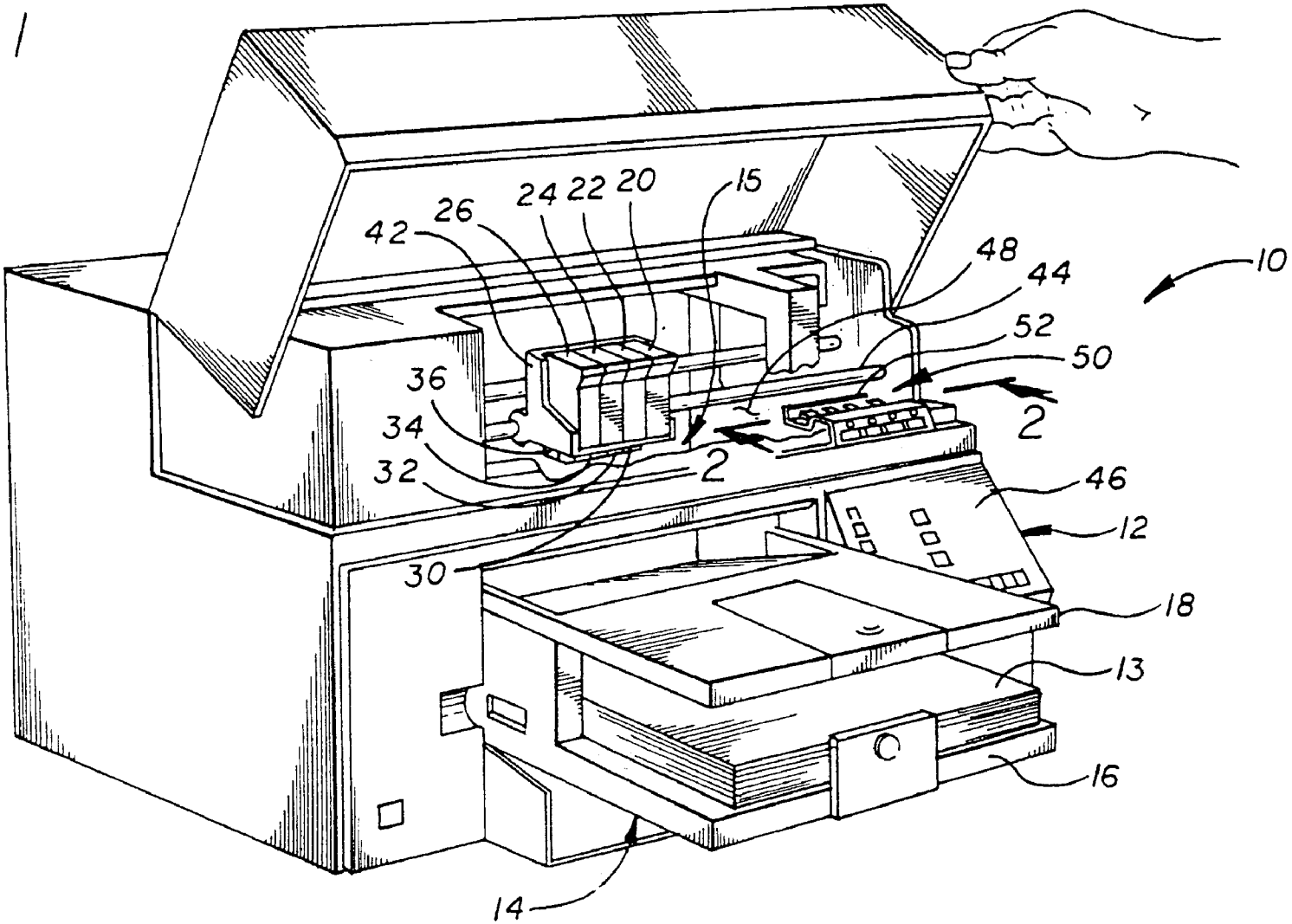
FIG. 1 is a perspective partly cutaway view of a computer driven printer, illustrating the environment of the invention in one embodiment.

With reference to FIG. 1 of the drawings, which are provided by way of exemplary illustration, and not by way of limitation, there is shown an embodiment of an inkjet printing mechanism, here shown as an inkjet printer 10, constructed in accordance with the present invention. Such printers may be used for printing for business reports, correspondence, desktop publishing, and the like, in an industrial, office, home or other environment. A variety of inkjet printing mechanisms are commercially available. For instance, some of these printing mechanisms that may embody the present invention include plotters, portable printing units, copiers, cameras, and facsimile machines, to name a few, but for convenience the concepts of the present invention are illustrated in the environment of an inkjet printer 10.

While it is apparent that the printer components may vary from model to model, the typical inkjet printer 10 includes a chassis 12 and a print medium handling system 14 for supplying a print medium 13 to the printer 10. The print medium can be one of numerous types of suitable sheet material, such as paper, card-stock, transparencies, mylar, foils, etc. depending on the application, but for convenience, the illustrated embodiment is described using paper as the print medium. The print medium handling system 14 moves the print media into a print zone 15 from a feed tray 16 to an output tray 18, for instance using a series of conventional motor-driven rollers (not shown). In the print zone 15, the media sheets receive ink from an inkjet pen cartridge, such as a black ink pen cartridge 20 and/or one or more color ink pen cartridges 22, 24, 26. The illustrated embodiment employs a group of 4 discrete monochrome pens, however in other embodiments, for example, a tri-color pen can be used with a monochrome black ink pen, or a single monochrome black pen 20 may be used alone.

Figure 2:
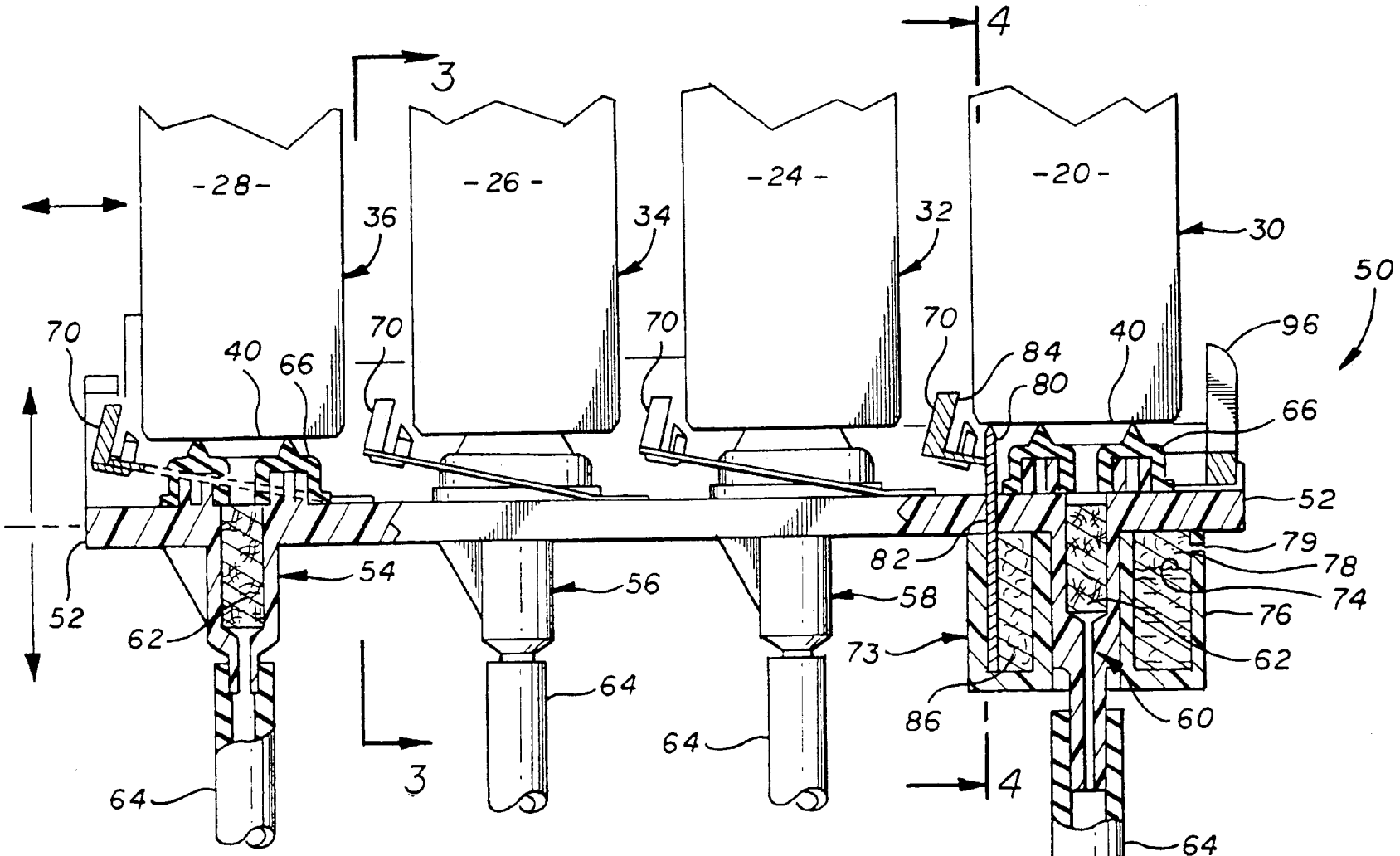
FIG. 2 is a front elevation partly in section of a portion of a service station of the printer of FIG. 1 showing four carriage-borne pen cartridges in proximity to the service station taken along line 2—2 in FIG. 1.
Figure 3:
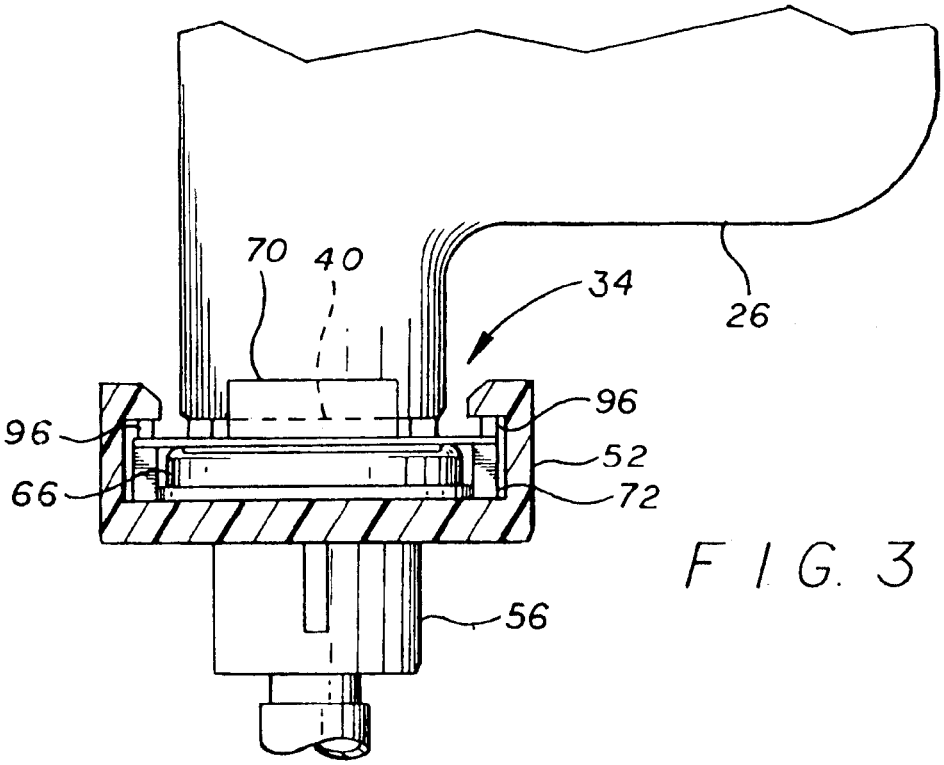
FIG. 3 is an elevational view, partly in cross section, taken along line 3—3 in FIG. 2.
Figure 4:
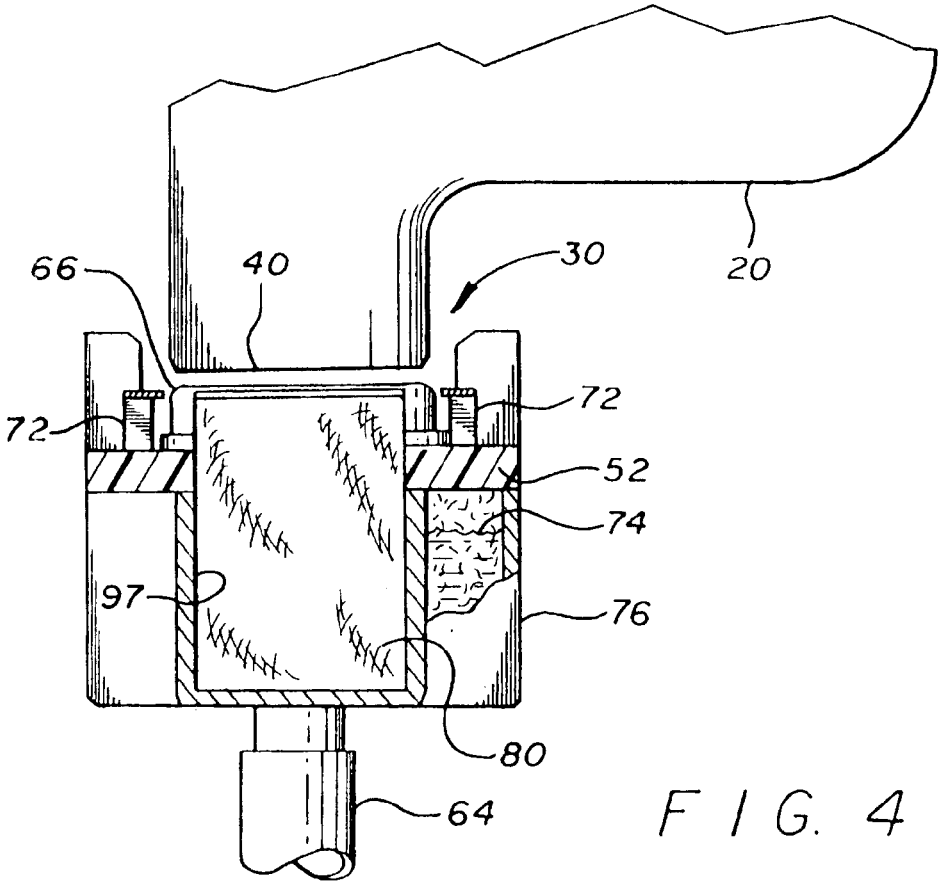
FIG. 4 is an elevational view, partly in cross section taken along line 4—4 in FIG. 2.

The illustrated pen cartridges 20, 22, 24, 26 each include reservoirs for storing a supply of ink therein, although other ink supply storage arrangements, such as those having reservoirs mounted on the chassis 12 and fluidly connected by a flexible conduit for example, may also be used. The cartridges 20, 22, 24, 26 incorporate printheads 30, 32, 34, 36 respectively. With reference also to FIGS. 2, 3 and 4, as is known in the art each printhead has an orifice plate surface 40 with a plurality of nozzles (not shown), formed therein in a manner well known to those skilled in the art. The illustrated printheads 30, 32, 34, 36 are thermal inkjet printheads, although it will be understood that other similar printheads are to be included in the scope of application of the invention. The printheads 30, 32, 24, 26 typically include a plurality of resistors (not shown) which are associated with the nozzles. As is known, upon energizing a selected resistor a drop of ink is ejected from the nozzle and onto a sheet of paper 13 in the printer zone 15 under the nozzle.

Returning to FIG. 1 particularly, the pen cartridge 20, 22, 24, 26 are transported by a carriage 42 which may be driven along a guide rod 44 by a conventional drive belt/pulley and motor arrangement (not shown). The pens selectively deposit one or more ink droplets on a sheet of paper 13 in accordance with signals received via a conductor strip (not shown) from a printer controller, such as a microprocessor (not shown) located within the chassis 12. The controller typically receives instructions from a computer, such as a personal computer (not shown). The printhead carriage 42 and paper handling system 14 also operate in response to control signals form the printer controller in a manner well known to those skilled in the art. The printer controller may also operate in response to user inputs provided through a key pad 46.

The printer chassis 12 defines a chamber 48 that provides a printhead servicing region including a service station 50, supported by the chassis and located at one end limit of the travel path of the carriage 42. The service station 50 includes a vertically moveable platform or frame referred to herein as a sled 52, supported by the service station within the servicing region. The sled is configured to support various service station components, such as wipers, caps, and priming units. A variety of suitable capping and printing designs are known and commercially available. In one embodiment (not shown) one or more wipers may be positioned stationary and only the caps are vertically moveable.

Referring now to FIG. 2, the illustrated service station 50 includes the sled 52, which itself embodies printing units 54, 56, 58, 60 formed unitary therewith. A filter 62 is inclosed in each priming unit to prevent ink from being drawn into a priming vacuum line 64. The priming units draw ink from the printheads 30, 32, 34, 36 in clearing the nozzles (not shown) terminating at the orifice plate surface 40 of each printhead. This is done when the pen being primed is aligned with a priming unit, also with a cap 66. The cap is brought into sealing contact with the printhead 30, 32, 34, or 36, and a vacuum is applied. Ink drawer from the nozzles may collect on the orifice plate surface 40 of each pen primed. Further, as mentioned, debris such as paper fibers or dried ink for example may collect on the orifice plate surface. Capping the pens minimizes the drying of ink, but if dried ink (mixed or not with other debris) is present before a pen is capped, and/or the pen is capped for a long period of time before the pen is primed, dried accumulations may be present as well as freshly drawn ink occasioned by the priming process. The sled has a first, capped, position, a second wipe position and a third clear position, the position of the sled being coordinated with movement and position of the printhead carried by the carriage 42 to allow the printhead to pass or be aligned with components of the service station as desired, and to come into contact or not with a wiper 70 for example.

Before a primed pen 20, 22, 24, or 26 is again moved to the print zone 15 to print, these accumulations are removed in this embodiment by moving the sled to the wiper position and passing the printhead 30, 32, 34, or 36 desired to be cleaned past the wiper 70 which is carried by a spring mount 72. As seen in FIG. 3, the wiper 70 is positioned so as to interfere with the travel of the printhead 34, even after the sled 52 is moved downward and away from the printhead to the wipe position so as to un-cap the pen and allow such travel. The spring mount 72 deflects as required as the wiper is pushed downward by the printhead to let the printhead pass. A resulting rebound force is applied to the wiper, holding it against the orifice plate surface 40 for example as the printhead passes. As will be apparent, the wiping action of the relative movement between the printhead and wiper is intended to wipe or scrape ink and other accumulations from the orifice plate surface, with the desired result being improved printhead function and print quality.

As mentioned however, often in known devices the wiping action is less effective than desired. This can be due for example to the wiper being worn from numerous previous wiping cycles and/or dried accumulations being too firmly attached to the orifice plate surface to be removed in this way.

Referring now to FIGS. 2 and 4, in the illustrated embodiment of the invention the effectiveness of the wiping action is improved, particularly with regard to relatively more quickly drying pigment-based inks, by providing treatment fluid from a source 73 of treatment fluid 74 including a fluid container 76 sealingly attached to the underside of the sled 52 forming a closed fluid reservoir chamber 78 near a cap 66 of the service station 50. For purposes of illustration, the discussion herein will be directed to application of the invention to a single pen 20 of the multiple pens 20, 22, 24, 26 carried by the carriage (42 of FIG. 1) and the associated service station structure 50 penetrating to this pen. In the exemplary embodiment the pen 20 is a black ink pen which utilizes an ink having a relatively high pigment content and fast-drying characteristics. However, it will be understood by one skilled in the art that the discussion is applicable to each and all of the pens used in the printer 10.

The treatment fluid 74 serves one or more of several functions depending upon the particular application. First, it lubricates the wiper 70 in wiping so as to reduce wear of the wiper. As is readily appreciated, wiper function is dependent on maintaining a desired wiper geometry, for example a wiper edge 84. Wear changes this geometry, for example by degradation of this edge over the life of the printer 10 to a rounded or uneven shape. Lubrication of the wiper accordingly provides better wiping function over the life of the printer by reducing wear of the wiper.

A second benefit of the treatment fluid 74 is that it dissolves some of the dried ink residues accumulated on the printhead 30. This allows such deposits to be more easily removed.

Third, the treatment fluid 74 helps the wiper 70 to transport both dissolved ink and other dried residue and accumulations in wiping. This results in a more thorough removal of such debris.

A fourth function of the treatment fluid 74 is that a thin film of fluid, which does not dry, is left on the printhead 30. Ink residue and other debris subsequently deposited on the printhead over this layer of fluid are more easily wiped off as they have less tendency to adhere to the printhead.

The treatment fluid used in the exemplary embodiment, polyethylene glycol (PEG), is relatively non-volatile, and relatively viscous. Again, depending on application, other fluids may be used, for example having properties selected for optimal performance with the particular ink being used. Treatment fluids that have been found to work well with pigment-based inks are generally characterizable in that they are water-soluble, somewhat viscous, and relatively non-volatile. Depending on the application PEG having an molecular weight of between about 200 and 600 is used. It has been found that by mixing PEGs of differing molecular weights treatment fluid properties can be varied to perform optimally in various embodiments of the invention for example.

Variation of the material comprising the treatment fluid 74, and the properties of a given material can be made so as to emphasize any function, such as lubrication, to increase wiper and printhead 30 life. Or alternatively, for example, it could be selected to best help dissolve ink residue and/or prevent residue and contaminants from adhering to the printhead.

An applicator, being in the illustrated embodiment a wick 80, is provided which draws treatment fluid from the fluid chamber 76 by capillary action, and is disposed through an opening 82 in the sled 52 between the cap 66 and wiper 70. Thus positioned it extends upward beyond the sled sufficient distance to contact the printhead 30 when it is in the capped position. A small reproducible amount of treatment fluid is deposited on the orifice plate 40 of the printhead 30 as a result of this contact. This treatment fluid is placed adjacent an edge of the plate nearest the wiper at a location wiped by the wiper so as to be available to the wiper in a subsequent printhead wiping operation. The wiper 70 will first come in contact with the deposited treatment fluid and thereafter wipe across the portion of the orifice plate to be cleaned. This can be made to occur each time the printhead 30 is wiped for example. As will be apparent, if the pen is not otherwise to be capped, the operation of dabbing, or depositing treatment fluid on the printhead orifice plate before wiping in this way is performed in a relatively short time. Also application of treatment fluid to printhead can be combined with priming.

In another embodiment (not shown), the applicator wick can be carried by a spring-mounted gimbal. Freedom of movement about two perpendicular axes for example provides uniform contact between such an applicator wick and a printhead.

The amount of fluid deposited depends on the surface area of the contact, the pore size of the applicator wick used, the properties of the surface of the orifice plate 40, the properties of the treatment fluid, and the relative force (if any) applied at the contact point due to relative positioning for example, or that applied as a result of a spring mounting (not shown) being used. In the illustrated embodiment the fluid supply is intended to be sufficient for the life of the printer, accordingly only a small amount of fluid is transferred to the printhead each time the wick makes contact.

In the illustrated embodiment the wick 80 is positioned to just come in contact with the printhead 30 when the pen 20 is capped. Force great enough to appreciably deform the wick is not applied to the wick by the printhead and vice-versa. The size of a rectangular area at the tip of the wick which comes in contact with the surface 40 of the printhead is approximately 12 millimeters by 0.5 millimeters. The relative porosity of the wick is characterized by a pore size of approximately 60 microns. The treatment fluid used is a PEG of molecular weight 400. This combination has been found to work well with presently-known and commercially-available orifice plates, for example those sold throughout the world by the assignee of the present invention.

In a further alternate embodiment, the applicator wick 80 is positioned so as to not contact the printhead 30 while capped, but rather, wipingly contact the printhead as the printhead it moves past along its path of motion with the carriage and deposits treatment fluid on the printhead. This wiping contact occurs when the sled is in the second, or wiping position. As the printhead 30 moves towards the print zone, the wick applies treatment fluid as said printhead moves past the applicator wick. Subsequently, the wiper wipes the orifice plate, clearing treatment fluid and unwanted accumulations therefrom.

Figure 5:
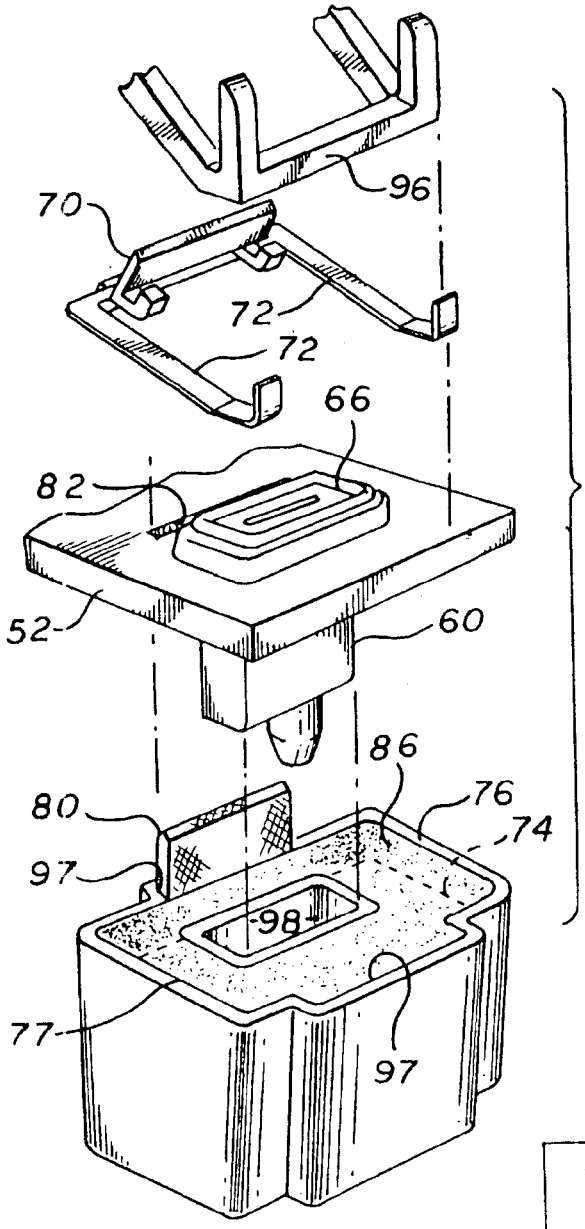
FIG. 5 is an exploded perspective view of the portion of the service station sled, including a treatment fluid reservoir and wick applicator wick container, cap, wiper and wiper mount seen in FIG. 2.

In the illustrated embodiment, the applicator wick 80 is stabilized by the shape of the container 76 and by a second wicking material block 86 which fits snugly within the fluid container 76. This is perhaps best appreciated as shown in FIG. 5. An open-cell foam for example may be used to form the second wicking block. The foam should be selected so as to be compatible with the treatment fluid. Polyurethane foam can be used with PEG treatment fluid for example. The fluid is transported by capillary action through this block to the applicator wick 80, which can be formed of a material having relatively higher capillary attraction force properties. The applicator wick itself can be formed so as to have greater capillary attraction forces acting in and adjacent its upper extract which actually contacts the printhead 30 for example by compressing the applicator wick in this location. The applicator wick in any case is continuously supplied with treatment fluid which is drawn upward for application to the printhead.

With reference to FIGS. 2, 4 and 5, in more particularity after treatment fluid 74 is deposited on the orifice plate 40, with subsequent relative movement of the wiper 70 across the printhead 30 the wiper moves the treatment fluid in front of it. This fluid wets the wiper and the surface of the printhead, particularly the orifice plate outer surface 40 in the area of the nozzles, and the wiper provides any one or more of the beneficial actions discussed above that the selected fluid used is desired to provide. As is often the case in printhead cleaning system designs, a scraper (not shown) is provided to remove accumulations from the wipers so that it is clean for the next time the wiper wipes the printhead.

The closed chamber 78 containing the supply of treatment fluid 74 is scaled but for the opening 82 through the sled 52. The configuration of the container, sled, applicator wick, and second reservoir wicking block 77 formed of a porous media such as rigid or elastomeric open-cell foam which completely fills the chamber, acts by capillary forces to prevent treatment fluid from leaking from the chamber during shipment for example. As can be appreciated, a small vent opening 79 can be provided to allow air to enter as fluid is withdrawn.

Other embodiments of the invention employ any of several types of treatment fluid sources, as discussed below including chambers disposed elsewhere in, on, or adjacent the service station 50, or, alternatively, collapsible flexible enclosures such as accordion folded envelopes or simple bags formed of a flexible material. In any case the treatment fluid source should be designed to prevent leaking of the fluid. In rigid chamber constructions, having an opening for admitting air, this can be accomplished by filling the chamber with a porous media such as foam, as shown, or fibers (oriented or random) to provide pore spaces small enough so that capillary action will prevent fluid from leaking, or providing a one way valve at the air intake opening. With a flexible bag containing only treatment fluid, leaking due to air expanding in the chamber due to a temperature change during shipping, for example, can be prevented as a vent is not required due to collapsibility of the bag. In this latter embodiment the flexible bag is connected by conventional means to a tube, in turn conventionally connected to a housing of a wick holder comprising the wick applicator, the holder being mounted (for example by a spring gimbal mount) at the proper location adjacent a wiper.

In further alternate embodiments (not shown) the treatment fluid is fed by gravity from a reservoir to a wicker holder. The wick holder can enclose all but the tip of the applicator wick, which tip can have a higher capillary force than the rest of the applicator wick (formed for example of another material). Treatment fluid is drawn to the tip by capillary action and subsequently applied to the printhead.

Figure 6:
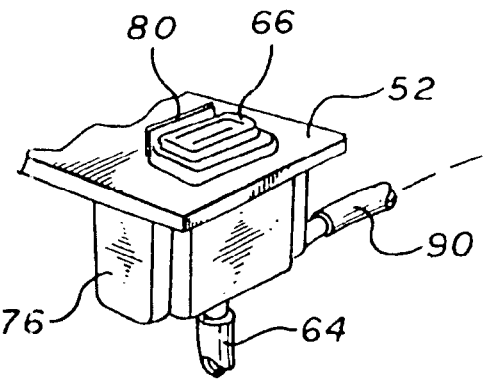
FIG. 6 is a schematic perspective illustrating an alternate embodiment of the invention shown in FIG. 5, having a further treatment fluid reservoir and conduit for periodically replenishing treatment fluid at the wick applicator.
Figure 6:
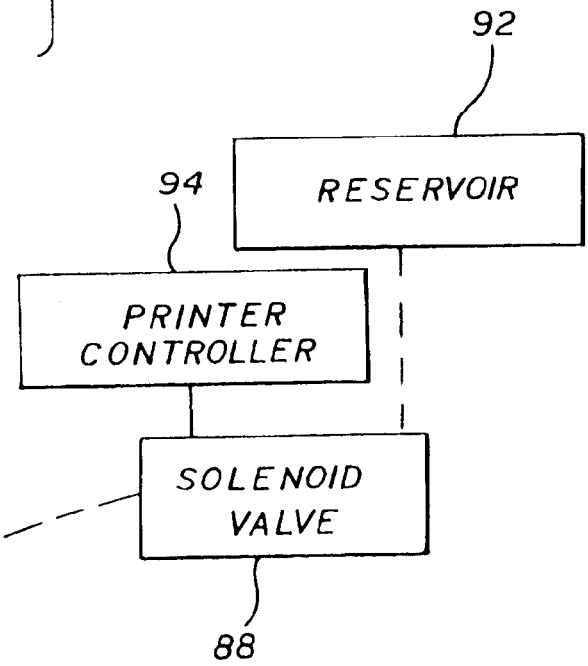

In another embodiment, shown schematically in FIG. 6, in order to keep treatment fluid from leaking during shipment or other movement, such as turning the printer on a side to connect cables for example, a normally closed solenoid valve 88 is provided in a tubing line 90 connecting a wick holder (such as the container 76 and sled 52 of the illustrated embodiment) with a further treatment fluid reservoir 92. This solenoid valve can be controlled by the printer controller 94 so as to be open only when a specific printer operation is taking place for example moving the carriage or uncapping a printhead in normal operation, the printer operation being selected to be incompatible with movement or tipping of the printer 10 which could cause filled 74 to leak from the system, such as in shipping, for example. In this way it can be virtually assured that there will be no leaks.

Alternatively, the flow of treatment fluid to the applicator wick 80 through the line 90 can be controlled by other means (not shown) so that fluid will never leak. One means for example is to use a switch or mechanical valve that is open only when the printer is upright and in operation.

As can be appreciated, the embodiment of FIG. 6 could be employed in connection with controlling flow of treatment fluid to the applicator wick for another reason. For example, a relatively more volatile treatment fluid could be dosed to the applicator wick only as needed just prior to application to the printhead.

Referring to FIG. 7, in a further alternate embodiment the treatment fluid is contained in a reservoir 100 filled by a porous material 108 disposed within the pen cartridge 20 itself, and dispensed by an applicator wick 102 configured so that a surface portion 104 of the wick forms a portion of a wiped outer surface 106 of the printhead portion 30 of the pen cartridge 20. Treatment fluid is thereby transported to and placed at the outer surface of the printhead by and through the wick applicator. The location of the surface portion 104 of the outer surface of the printhead comprising the wick is adjacent a leading edge or side of the printhead which is first contacted by the wiper 70 in wiping the printhead. Accordingly treatment fluid made available there between the orifice plate 40 and the leading edge or side where it will be contacted by the wiper before the wiper continues across the outer surface 106 of the printhead. The wiper is wetted in connection with wipingly engaging the wick applicator portion of the outer surface of the printhead. Then, pushing treatment fluid before it, the wiper moves across the portion of the printhead to be cleaned, for example the critical area adjacent the nozzle orifices in wiping contact therewith.

Among the possible ways to implement this embodiment of the present invention a design found to work well involves incorporating a porous open cell rigid foam block 108 in the treatment fluid reservoir 100 incorporated in the pen 20. This foam block completely fills the reservoir and is impregnated with treatment fluid. In a further embodiment (not shown) the wick 102 is eliminated and an exposed portion of this foam is positioned to intercept the wiper 70 in relative wiping movement.

Referring to FIG. 7a in another alternate embodiment the wick applicator 102 is replaced by a "capillary" applicator 109 comprising two identical elastomeric flap components 110, 111 having planar opposed surfaces separated by a capillary space 112 therebetween. It has been found that treatment fluid migrates in the capillary space between the two halves of the applicator and is available at a tip portion 114 to be transferred to the wiper by wiping contact between the wiper and the capillary applicator.

An example of a device where a treatment fluid is carried with the pen, and a device having a two-piece wiper having two pieces with opposed surfaces and a capillary space therebetween for conveying a treatment fluid to the tip of the wiper is disclosed in commonly-owned U.S. Pat. No. 5,300,958 issued Apr. 5, 1994 to Burke, et al., the disclosure of which is incorporated herein by reference.

As will be apparent, this pen-mounted treatment fluid source allows replacement of the treatment fluid supply with each new pen cartridge 20. This embodiment allows a smaller amount of treatment fluid to be stored and reliably dispensed (one pen life vs. a printer lifetime supply), and allows the lubricant to be more closely matched with the properties of the ink used. This later consideration is particularly noteworthy as it allows improvement of the ink formulations used over the lifetime of the printer without needing to consider the properties of the treatment fluid embodied in existing printers.

Returning now to FIG. 5, it can be appreciated that assembly of the few simple components of the embodiment is easily accomplished by placing the applicator wick 80 and second wicking material block 86 into the treatment fluid container 76 and filling the container with treatment fluid 74. The block 86 fits tightly in the container and holds the applicator wick in a channel 97 adapted to receive the applicator wick, the components cooperating to hold the applicator wick in correct alignment for assembly.

The treatment fluid container 76 is then joined to the sled by solvent or sonic welding, or by use of an adhesive for example, passing the applicator wick through the opening 82 to do so. The treatment fluid container 76 is configured to provide a receptacle 98 which receives the printing unit 60 of the sled 52. In another operation a wiper 70 formed of an elastomeric material having desired properties is mounted on a spring mount 72 which is retained against the sled by a portion of a retainer 96 which cooperates with the sled for this purpose.

With reference now to FIG. 8, in another embodiment treatment fluid 74 is contained in a separate applicator housing 116 carried by the guide rod 44 and biased to a first position 117 between the service station 50 and the print zone 15 of the printer by a coil spring 118. The applicator has a chamber 120 filled by a wicking material such as an open-cell foam. The foam is in contact with a wicking nib applicator 122 which protrudes below the housing and is configured to apply treatment fluid in small reproducible quantities to elastomeric wipers 124 positioned on the service station sled 52. The applicator housing further comprises scraper portions 126 configured to contact the wipers in scraping fashion to remove unwanted accumulations that may be present on the wipers.

In operation the carriage 42 moving towards the service station 50 first contacts the applicator housing 116 at the first position 117 and moves the applicator ahead of the carriage across the service station to a second position 119 where it remains while the pens 20, 22, 24, 26 are positioned adjacent their respective caps 66 for servicing or when caped between printing operations for example. As the carriage moves toward the print zone 15 from the service station 50 the applicator housing 116 follows the carriage 42 due to the rebound force of the biasing coil spring 118. As the applicator housing 116 traverses the service station in each direction the wicking tip applicator wipingly contacts the wipers 124 and deposits a small reproducible amount of treatment fluid, for example such as 1–5 microliters of PEG, to each wiper to assist in wiping as before described. As can be appreciated in this embodiment treatment fluid is first applied to the wiper 124, rather than the printhead 30. It will be noticed also that wiping in both directions of carriage travel occurs in this embodiment, and that treatment fluid is similarly applied to the wipers.

This embodiment gives the advantage of dosing the wipers 124 with treatment fluid by an applicator 122 moving with the pens 20, 22, 24, 26 without having to mount it (or a reservoir 120 of treatment fluid to supply it) on the carriage 42. In another embodiment the applicator housing 116 can comprise a separate treatment fluid cartridge which can be replaced periodically.

Figure 9:
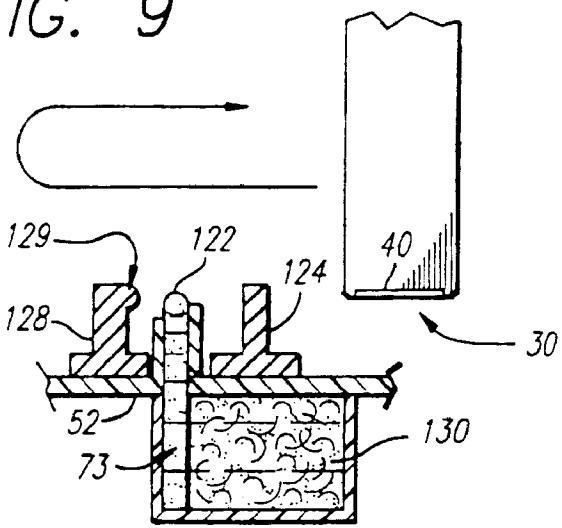
FIG. 9 is an elevational view, partially in section, of an alternate embodiment of the invention.
Figure 10:
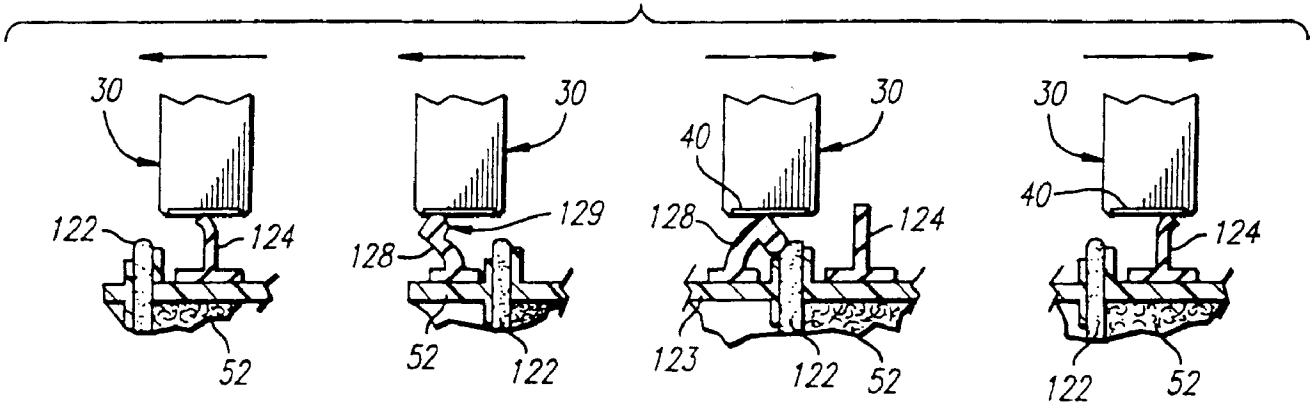
FIG. 10 is an illustration of the modes of operation of the embodiment of FIG. 9.

Referring to FIGS. 9 and 10 in another embodiment of the invention a wiping system is provided wherein the printhead 30 moves back and forth across a first wiper 124 mounted on the sled 52 and back and forth across a second applicator wiper combination 128 of specialized configuration mounted on the sled on an opposite side of a wicking applicator nib 122. As the printhead moves to the left in the figures the printhead is first wiped by the first wiper, and then contacts a rounded applicator portion 129 of the second wiper 128 which has previously been dosed with treatment fluid. After passing the transfer wiper the printhead direction of travel is reversed and the printhead moves to the right in FIGS. 9 and 10. The orifice plate 40 is wiped by the second wiper as the printhead continues to move right. At the same time the second wiper is deflected in the direction of printhead travel and the rounded applicator portion is bent over and downward to contact the wicking applicator nib 122 made of a porous wicking material and saturated with treatment fluid from a reservoir 130 filled with a second wicking porous media such as an open cell foam or fibrous material as described above. A small reproducible amount of treatment fluid is transferred to the second wiper's rounded applicator portion by this contact, and this fluid is available to assist in wiping on the next wiping cycle. The printhead continues its movement to the right in the figures and is wiped a second time by the first wiper 124. A scraper (not shown) can be placed on the carriage to clean the wipers by wiping contact. As can be appreciated the scraper is placed to the right of the printhead 30 in FIGS. 9 and 10 so as to scrape the transfer wiper only after it has transferred treatment fluid to the printhead.

This embodiment provides an advantage in that the applicator wiper combination 128 acts as an intermediate transfer element to transfer treatment fluid from a source of treatment fluid 73 to the printhead. The result is that the applicator nib 122, and consequently the treatment fluid 74 is kept cleaner as the printhead 30 is wiped by the first wiper just previous to application of treatment fluid by the applicator/wiper combination 128 and the applicator nib 122 does not directly contact the printhead.

Figure 11:
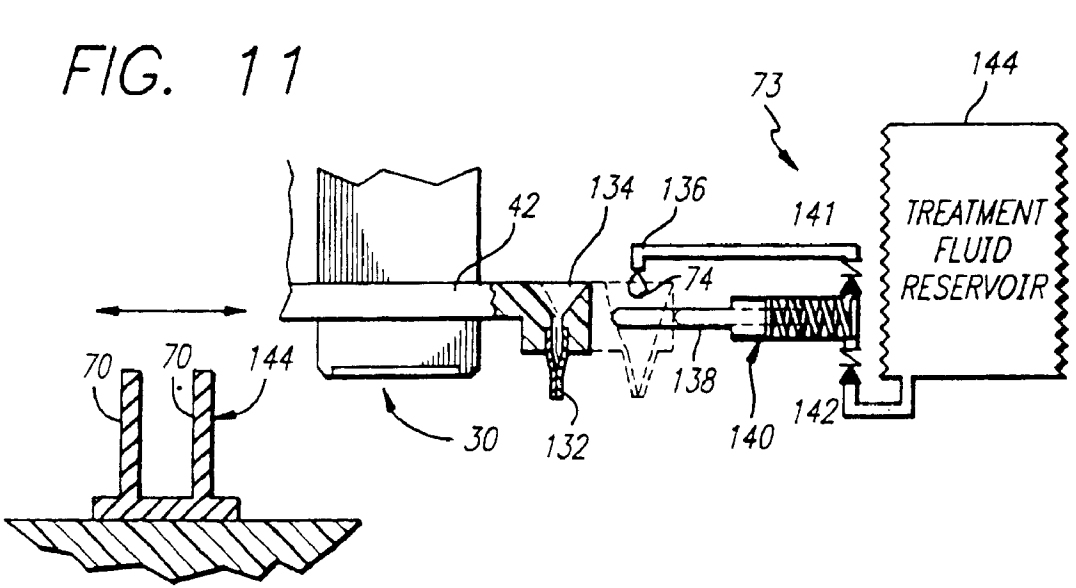
FIG. 11 is a schematic illustration, partially in break-away section, of an alternate embodiment of the invention.
Figure 22:
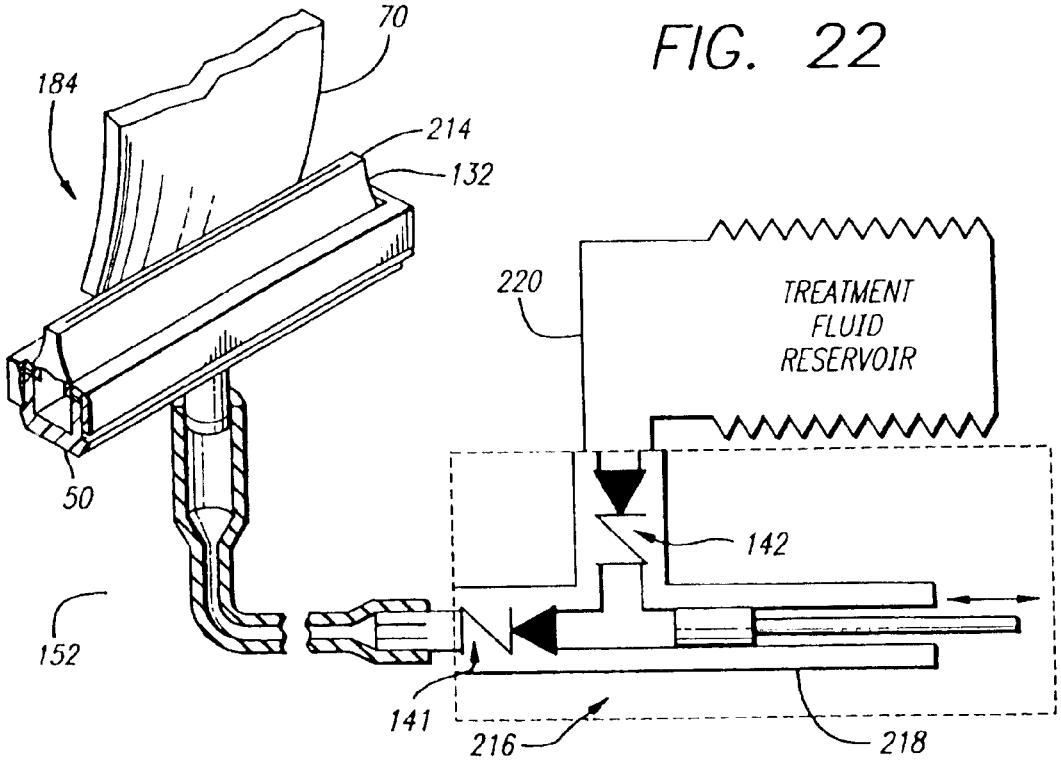
FIG. 22 is a perspective schematic representation, in partial cut-away, of an alternate embodiment of the invention.

With reference now to FIG. 11 in another embodiment a doseable elastomeric applicator 132 having the form of a duckbill mounted on the carriage 42 beneath a hopper 134 adapted to receive treatment fluid 74 from a stationary spigot 136 located at the service station at an end of the carriage's range of travel. A similar duckbill-like applicator is shown in FIG. 22. Returning to FIG. 11, as the carriage nears the end of its range of travel (to the right in FIG. 11) it contacts and depresses a spring-biased plunger 138 actuating a low volume pump 140 further comprising a pair of check valves 141 and 142. The configuration and mode of operation of such pumps is well known. A small-volume dose of treatment fluid is pumped into the hopper and, urged by gravity, migrates to the applicator 132. The applicator is configured to wipingly engage a wiper set 144 having two wipers 70 adapted to wipe the printhead 30, and a small reproducible amount of treatment fluid is dispensed at each such contact due to deformation of the elastomeric applicator at each such wiping contact. The wipers can be identical or have differing configurations to achieve a desired effect when the printhead is moved past. The motion of the carriage being controlled by the printer controller (not shown) the dispensing of treatment fluid into the hopper can be programmed to occur to dose the applicator as needed to maintain a small amount of treatment fluid in the applicator. For example the carriage can be moved to the limit of travel to dispense 1–5 microliters each time the printhead is serviced, or at longer intervals, for example dispensing 1–25 microliters of treatment fluid into the hopper once every 5 times the printhead 30 is serviced. A collapsible treatment fluid reservoir 144 is connected to the pump to provide a leak-proof printer-lifetime supply of treatment fluid.

This embodiment provides the advantage of a carriage-mounted treatment fluid applicator 132 without having to carry the treatment fluid reservoir 144 on the carriage. Accordingly the doseable applicator 132 acts as a transfer element, transferring treatment fluid from a source 73 of treatment fluid 74 to the wiper 70. Also, by providing a checkvalve 141 located downstream of the pump 140 with sufficiently high cracking pressure, unwanted fluid leakage from the reservoir, such as might occur during shipment for example, is prevented. T he amount of treatment fluid in the hopper 134 is kept small so that leakage from the hopper due to tipping of the printer 10 for example, should it occur, is minimized. Also, the applicator 132 could be replaced by a wicking block formed of a porous media, which is periodically re-saturated with treatment fluid as required, to mitigate spilling from the hopper.

Figure 12:
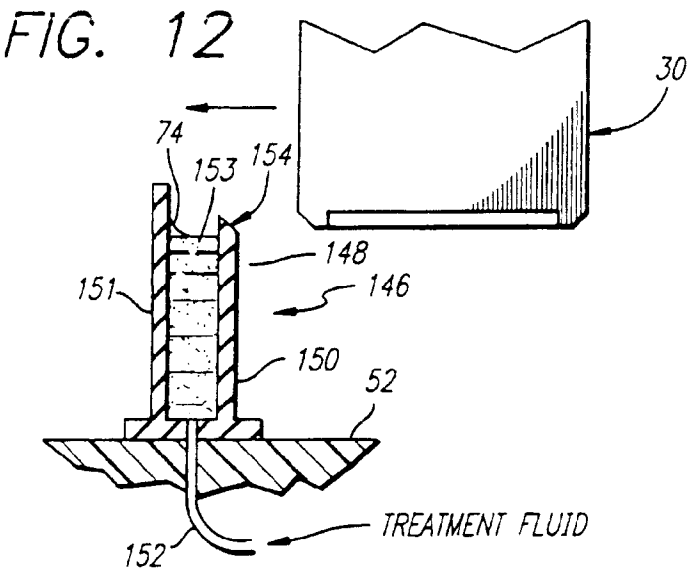
FIG. 12 is a elevational view, partially in section, of a portion of a service station illustrating an alternate embodiment of the invention.

Turning to FIG. 12 in another embodiment a composite treatment fluid dosing wiper 146 is provided on the sled 52 for wiping the printhead 30. A section of saturated porous material 148 such as an open-cell foam is sandwiched between two elastomeric wipers 150 and 151 of a specialized wiper set comprising the composite fluid dosing wiper. A passageway 152 is connected to a source of treatment fluid (not shown) such as a collapsible reservoir, and treatment fluid is drawn into the section of porous material as fluid is depleted therefrom. Replenishment of treatment fluid can be by gravity feed, or by capillary attractive forces in the porous material acting on the treatment fluid for example. Alternatively, the saturated foam is sized to accommodate a printer lifetime supply of treatment fluid. In one embodiment the wiper is wider in a direction transverse to that of wiping motion (out of the plane of the page in FIG. 12) and the ends of the wiper are each closed by a wall 153 formed unitary of EPDM with the wipers 150, 151 serving to contain treatment fluid in the composite wiper.

In operation, the printhead 30 wipingly contacts the composite dosing wiper 146, and in doing so deforms a first elastomeric wiper 150 and squeezes somewhat the saturated porous segment 148 causing treatment fluid 74 to be expelled upwardly onto the second wiper 151. The first wiper 150 is provided with a ramp portion 154 to assist in easing the relative wiping movement of the printhead 30 over the porous segment 148 so that no direct contact between the printhead and the porous segment occurs. As a result the foam comprising the porous segment is kept cleaner. The squeezing action of the wiping contact between the dosing wiper and the printhead gives rise to a pumping action which also can assist in drawing treatment fluid upward within the porous layer, as well as into the composite dosing wiper from the source of treatment fluid via the passageway 152.

Figure 13:
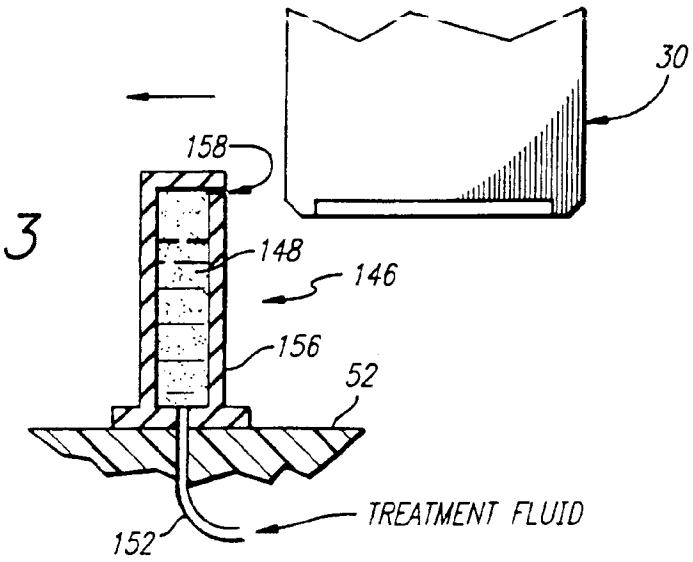
FIG. 13 is a elevational view, partially in section, of a portion of a service station illustrating an alternate embodiment of the invention.

As can be appreciated with reference to FIG. 13 in another embodiment a composite treatment fluid dosing wiper 146 likewise comprises a composite construction. An elastomeric outer envelope 156 of EDPM encloses an inner segment of treatment fluid-saturated porous material 148 fed by a conduit 152 as described above. A series of small openings 158 in the outer envelope are provided from which treatment fluid can emerge when the dosing wiper 146 is deformed in wiping. The opening 158 shown in the figure is enlarged for clarity, and as can be appreciated the openings are sized to meter the amount of treatment fluid dispensed at each wiping contact of the printhead 30 for example, and can alternatively comprise a series of openings which are normally closed but open upon deformation of the fluid dosing wiper 146.

Figure 14:
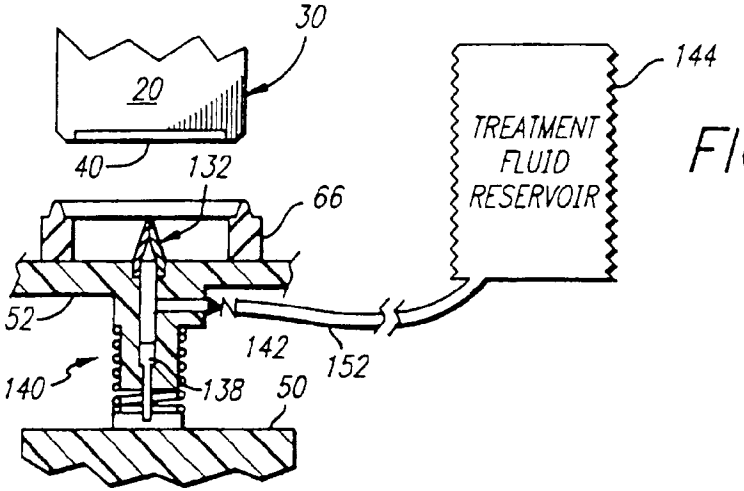
FIG. 14 is a elevational view, partially in section, of a portion of a service station illustrating an alternate embodiment of the invention.

Turning now to FIG. 14, in another embodiment of the invention a treatment fluid applicator 132 is positioned within the pen cap 66 itself. This allows the orifice plate 40 to be wetted with treatment fluid open the pen 20 being capped. In the illustrated embodiment the applicator is of duckbill valve-like configuration and applies treatment fluid when the treatment fluid within the applicator is sufficiently pressurized to exceed a cracking pressure of the duckbill, as is well understood by those skilled in the art. The orifice plate lightly contacts the applicator and a small amount of treatment fluid, for example up to about five microliters, is dispensed onto the orifice plate.

In the illustrated embodiment pressurization is provided by a spring-loaded piston pump 140 actuated by depression of the sled 52 as the printhead 30 of the pen 20 is capped, the pump being placed between the sled and printer service station structure 50 for example. The duckbill applicator 132 acts as a checkvalve in operation of the pump. A further checkvalve 142 is required for pumping, as is well known, and is placed in a conduit 152 supplying treatment fluid from a collapsible fluid reservoir 144 for example. A low volume spray pump (not shown) of conventional configuration could be substituted, such a pump having its nozzle projecting upward so as to spray the orifice plate 40 upon the pen being capped.

Figure 16:
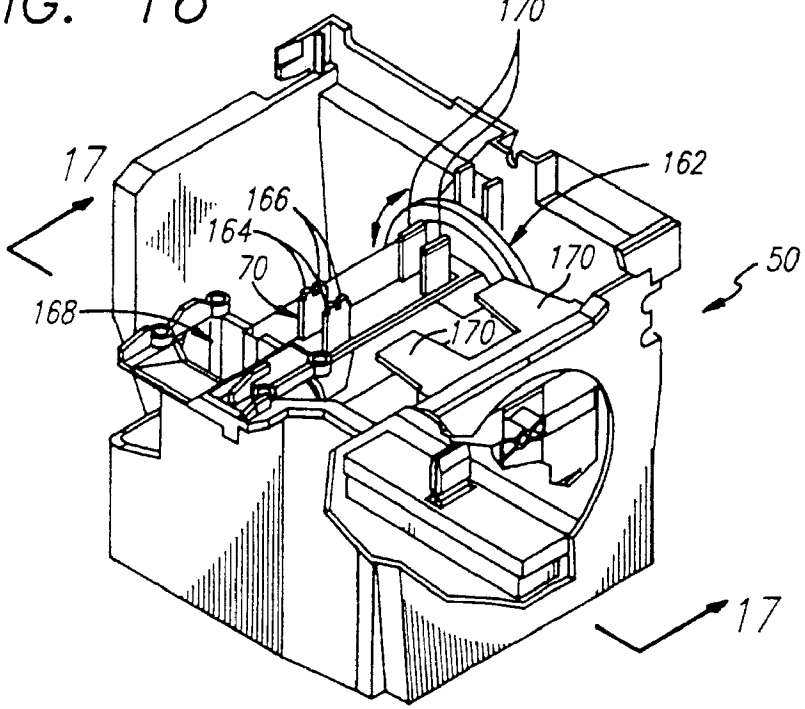
FIG. 16 is a perspective view, in partial cut-away, of a service station according to an alternate embodiment of the invention shown in FIG. 15.
Figure 15:
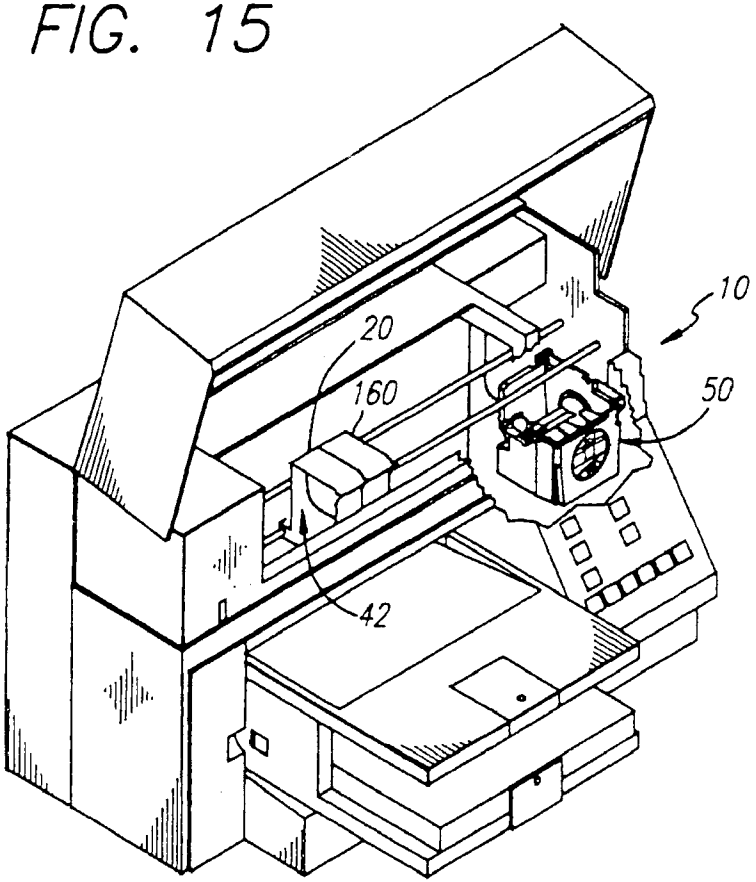
FIG. 15 is a perspective view, partially in cut-away, of a further printer, illustrating the environment of an alternate embodiment of the invention.
Figure 17:
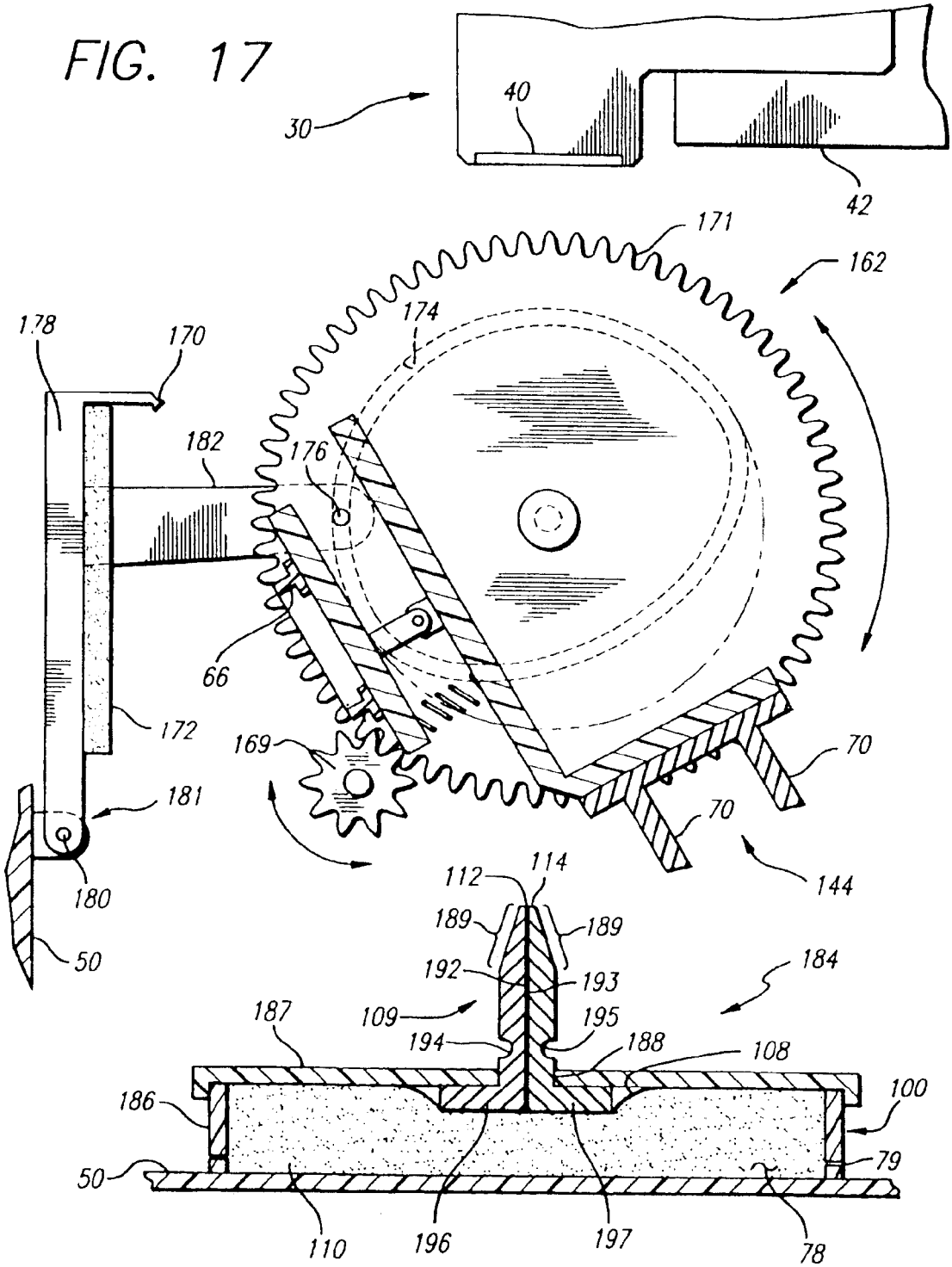
FIG. 17 is an elevational representation, partially in section, of the embodiment of the invention shown in FIG. 16 taken along line 17—17 in FIG. 16.

With reference to FIGS. 15, 16 and 17, in another embodiment of the invention a printer 10 incorporating a different way of servicing the printhead orifice plates 40 of the pens 20, 160 is illustrated. A black pen 20 and a tri-color pen 160 for example are used, carried on a reciprocating carriage 42. As will be will be apparent, the discussion can be applied to other configurations such as a four pen system as described above, as well as to various other types of inkjet printing devices. It will again be understood that where reference is made to one pen 20, printhead head 30, or wiper 70, etc. the same is understood to be generally applicable in multiple pen systems and to wiper sets having a plurality of wipers. The service station 50 incorporates wipers 70 which are carried by a rotatable tumbler 162 which rotates about an axis parallel to the reciprocating motion of the pens 20, 160 carried by the carriage 42 in printing operations. The direction of wiping is accordingly transverse to the direction of travel of the pens. The direction of wiping is aligned with the rows of orifices (not shown) in the orifice plate 40 from which ink is ejected in printing. Moreover, in one embodiment the wiper is configured with two separate projecting wiping portions 164, 166 which are aligned with and wipe only the area immediately adjacent each of the two rows of orifices in the orifice plate. This configuration maximizes wiping effect at critical locations on the printhead. As will be appreciated, the other embodiments described herein can utilize such a wiper configuration, though for simplicity a more simplified geometry is shown in the drawing figures.

Also incorporated in the tumbler 162 are caps 66 which are used to cap the pens as described above. The caps can be pivotally and/or spring-mounted on the tumbler to facilitate capping and a consistent tight seal. Provision for vacuum priming is not made in connection with the tumbler-mounted caps, and in this embodiment the orifice plate 40 nozzles are cleared by "spitting" ink into a "spittoon" 168 provided for catching ejected ink and debris. This spitting operation can be performed less often in a printer according to the invention due to the printhead being kept cleaner by increased wiping effectiveness achieved with use of treatment fluid. In another embodiment (not shown) the tumbler can be made to rise and lower by provision of movable supports for the tumbler and an actuation means, for example a worn gear arrangement, or a solenoid. This may be done for example in connection with capping the printhead 30 or rotating the wipers 70 past the printhead without contacting it.

With reference particularly to FIG. 17, the tumbler 162 is actuated by a driver gear 169 coupled to a drive motor (not shown). The drive gear engages peripherally disposed gear teeth 171. As can be appreciated, the drive motor is reversible and is controlled by the printer controller (not shown). The tumbler 162 accordingly can be rotated in either direction at a controllable speed, and reciprocating movement is possible. Scrapers 170 are provided within the service station to clean the wipers. Absorbent pads 172 are disposed adjacent the scrapers to catch ink, treatment fluid and any debris flung from the wipers as they rebound after passing by the scrapers as the wipers rotate past them (in a counter-clockwise direction in FIG. 17).

The scrapers are moveable closer to and away from the tumbler 162 to engage the wipers 70 as desired, but not the cap 66 for example. The movement of the scraper is coordinated with rotation of the tumbler by providing a cam surface 174 on the tumbler 162 and a follower 176 coupled to a hinged frame 178 carrying the scrapers. The frame pivots about a hinge 180 having an axis parallel to the axis of rotation of the tumbler. A link 182 connected to the cam follower is attached to the frame and in operation pulls a scraper-carrying first end of the frame opposite a second hinged end 181 of the frame closer to the tumbler as required for scraping the wipers 70 of a dual wiper set 144. In one embodiment the hinged frame is biased to a position away from the wiper for example, and is drawn closer by the cam surface.

The service station also includes a source of treatment fluid 184 disposed at the lower portion of the service station 50. This source of treatment fluid further includes a capillary applicator 109 in fluid contact with the interior of a closed chamber 78, similar to that described above, of a treatment fluid reservoir 100 containing a low volatility solvent 74 such as PEG described above. The capillary applicator 109 illustrated has two elastomeric flap components 190, 191 having chamfered portions 189 adjacent the upper tip 114 and planar opposed surfaces 192, 193 separated by a capillary space 112 therebetween. As described above, fluid rises in the capillary space to a tip portion 114. The applicator is formed of EDPM having a durometer of 70. The elastomeric flaps 190, 191 of the specialize applicator 109 are provided with hinge portions 194, 195 near their bases which allow the two halves of the upper part of the applicator to separate somewhat. This allows more treatment fluid to congruent at the upper portion by spreading the capillary wider in this area. In the illustrated embodiment the two elastomeric flaps are substantially identical. However, in another embodiment they can be given differing geometries, for example to provide a particular desired functional property.

Each of the flaps 190, 191 have identical geometries, simplifying assembly. For example in one embodiment each flap is four millimeters high measured from stabilizing wings 196, 197 disposed at their bases, and are one millimeter thick. The chamber portion 189 is three millimeters in height and has a thickness at the tips 114 of each flap of 0.2 millimeters. The width of the flaps (perpendicular to the plane of the page in FIG. 17) is at least as wide as the portion of the printhead to be wiped. The capillary space should be small enough so that there is a relatively higher attractive force associated therewith, and hence a capillary gradient from the reservoir 100 disposed below, sufficient to draw treatment fluid upwards into the capillary space.

The chamber 78 of the reservoir 100 is formed by a containment 186 formed in the service station 50 and a lid 187. The lid has an opening 188 through which the applicator protrudes. The enclosed interior volume is filled with an open-cell foam material, fibrous or otherwise porous material comprising a porous media wicking block 110 impregnated with treatment fluid. One or more small vents 79 are provided to admit air from near the bottom of the chamber 78 as treatment fluid is depleted from the reservoir. This arrangement is similar to that described above in that the fluid is retained in the reservoir by capillary attraction during shipping, etc. but is available to the wiper as required. In one embodiment the wicking block employs a polyurethane foam or other treatment fluid-compatible material having a pore size, pore volume, and capillary fluid attractive properties compatible with the applicator 109. In this regard the pores must be sufficiently large, even when compressed by the applicator as illustrated, and the foam properties otherwise selected so that a capillary gradient between the reservoir 100 and the applicator 109 tends to draw fluid upwards as discussed above.

As will be appreciated, the foam or other porous media comprising the wicking block 110 within the reservoir 100 is compressed somewhat at a location directly adjacent the applicator 109 as the applicator further comprises stabilizing wings 196 and 197 which protrude into and impinge upon the wicking block 110, reducing pore size at that location. Accordingly localized higher capillary forces within the wicking material will tend to draw treatment fluid toward the compressed area and make it available to the applicator at its base, to be drawn into the capillary space within the applicator and migrate to the upper tip portion 114.

Treatment fluid in a small reproducible quantity is transferred from the tip 114 to each wiper 70 as the wiper wipingly contacts the applicator 109 as it rotates past. After passing each of the wipers by the applicator for example, the wiper set 144 rotated around to the orifice plate 40 of a carriage-mounted pen 20 positioned for servicing and wipes the orifice plate. As mentioned, after wiping each wiper is cleaned by the scraper 170 as it passes by in wiping contact therewith. This process can be controlled according to a preprogrammed sequence by the printer controller, or in response to an operator-initiated cleaning sequence.

Figure 18:
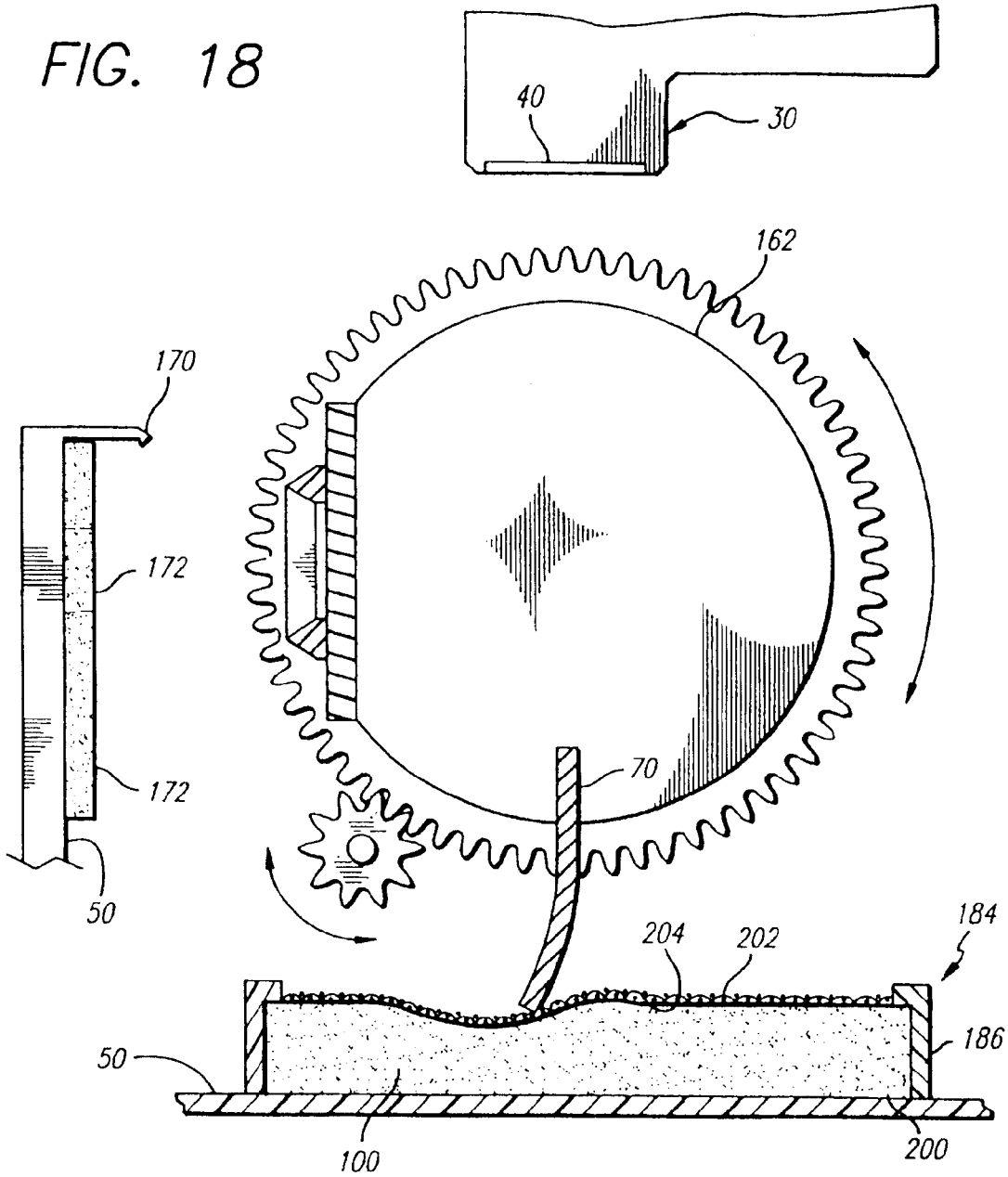
FIG. 18 is a schematic representation, partially in section, of an alternate embodiment of the invention shown in FIG. 17.

The source of treatment fluid 184 can take other forms. Referring to FIG. 18 for example, the illustrated embodiment comprises a captured block 200 of compliant open-cell elastomeric foam, having an exposed surface 202 which is wiped by the wiper 70. The captured block acts both as a reservoir and an applicator. The treatment fluid is retained in the foam by capillary forces as before described. In addition to the above-mentioned advantages in storage and transport obtained, it has been found that in this embodiment a "pumping" action in the foam occurring due to deformation by the passing wiper tends to wash the wiper and the exposed surface of the foam reservoir and bring new treatment fluid to the surface of the foam block, thereby dissipating somewhat deposits of ink left by the passing wiper that may otherwise accumulate at the exposed surface 202.

In a further embodiment a protective layer 204 of a differing material is placed over the exposed surface portion 202 of the foam. The layer serves to protect underlying foam or, alternatively, another porous media, from abrasion occasioned by the wiping contact of the wiper 70. The protective layer also serves a metering function if the porosity of the protective layer material is controlled to allow only a desired amount of treatment fluid through due to pumping action during each pass of the wiper, and also can be made to act to regulate the amount of fluid transferred to the wiper by providing a textured surface wiping or drawing excess fluid from the wiper as it passes. Depending on roughness of the surface 202 the protective layer 204 can also perform a wiper 70 cleaning function, removing dried ink accumulations for example as the wiper wipes the protective layer. The protective layer in one embodiment is made of a woven material such as polymeric filament or stainless steel wire fabric or metals, or a porous layer of another wear-resistant material, for example a more wear-resistant foam layer as described below, or a porous sheet of plastic or metal material which allows migration of treatment fluid therethrough. Such a sheet may be formed for example by a sintering process, or by ablating holes in a non-porous sheet. The relative wetting and pore size characteristics of the compliant foam block 200 comprising the fluid reservoir 100 and those of the protective layer 204 are controlled so that treatment fluid is drawn to the surface 202 to be available to the wiper by capillary action, or by the pumping action of the passage wiper, or some combination thereof.

In one embodiment the protective layer 204 is a nylon mesh, having a pore size small enough to retain the selected treatment fluid by capillary and attractive forces in the mesh. The mesh is disposed over a PEG-impregnated polyurethane foam. In another embodiment the protective layer is a stainless steel mesh. In either embodiment it has been found that the pore size of the mesh can be larger or smaller than that of the foam.

Figure 19:
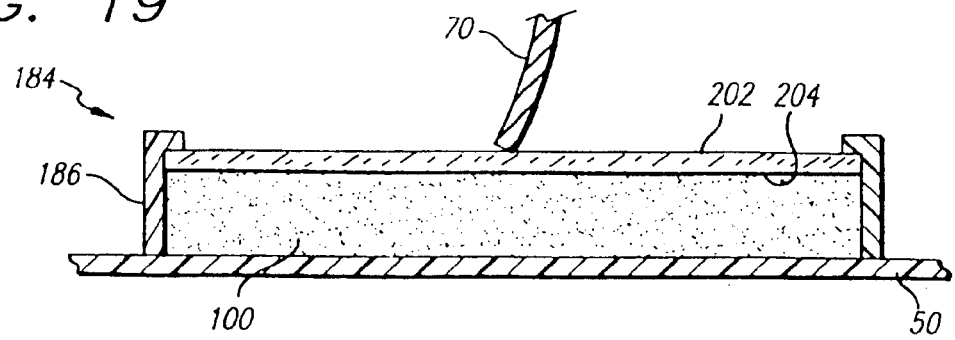
FIG. 19 is a sectional elevational view of a source of treatment fluid in a alternate embodiment of the invention.

Referring to FIG. 19 in another embodiment a foam laminate is created having a protective layer 204 of relatively rigid foam on top of a more compliant open-cell foam block 200 comprising the treatment fluid reservoir 100. Again in this embodiment the pore size and wetting characteristics are controlled to obtain the results desired. In one embodiment for example the top layer is a relatively stiffer porous polypropylene foam having a pore size of approximately one hundred microns and a pore volume of about forty percent. The underlying fluid reservoir foam is a polyurethane foam having a pore size greater than that of the upper layer so as to provide a capillary gradient tending to draw treatment fluid upwards from the bottom layer to the upper surface 202 of the reservoir.

Figure 19A:
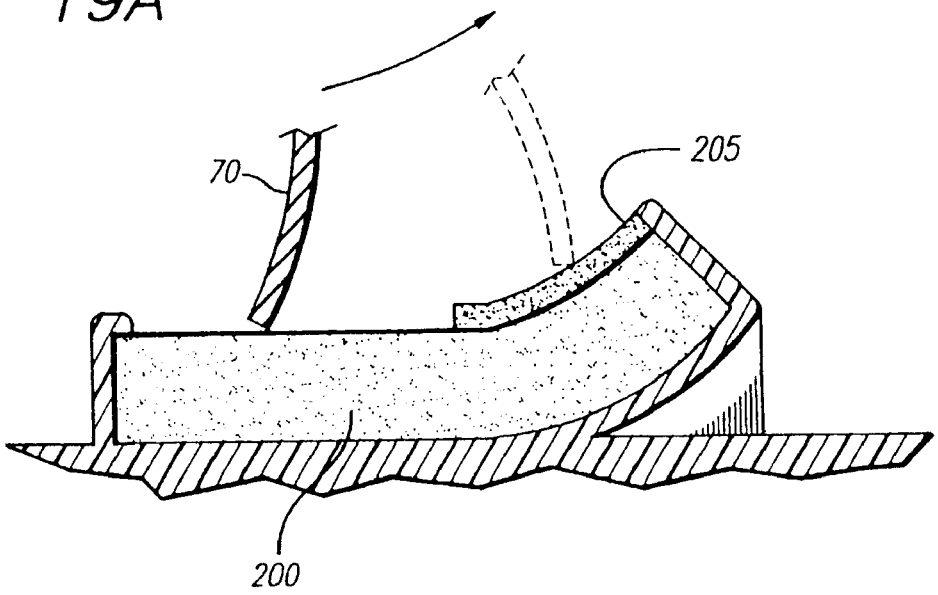
FIG. 19A is a sectional view of a source of treatment fluid in a alternate embodiment of the invention to that shown in FIG. 19.

With reference to FIG. 19A, a further reservoir/applicator embodiment comprises a captured block of compliant open-cell foam 200 partially exposed to the wiper 70 to be wiped thereby as discussed above, and a layer of stiffer foam 205 which overlays a part of the foam block 200. The stiffer foam is disposed at an angle to the portion of the open cell foam block 200 exposed to the wiper so as to be contactable by the wiper 70 the compliant foam is first wiped, bringing treatment fluid to the exposed surface 202 and transferring it to the wiper subsequently the stiffer foam is wiped as it continues to rotate, for example by action of a tumbler (not shown). This embodiment provides the advantage of the pumping and wiper washing action discussed above in connection with the open cell foam, as well as improved cleaning and metering characteristics of the stiffer foam layer 205 which the wiper contacts afterward. Ink residue for example is retained in the stiffer foam layer, while treatment fluid can pass through to the underlying open cell foam block 200 to again be available to be applied to the wiper.

Figure 20:
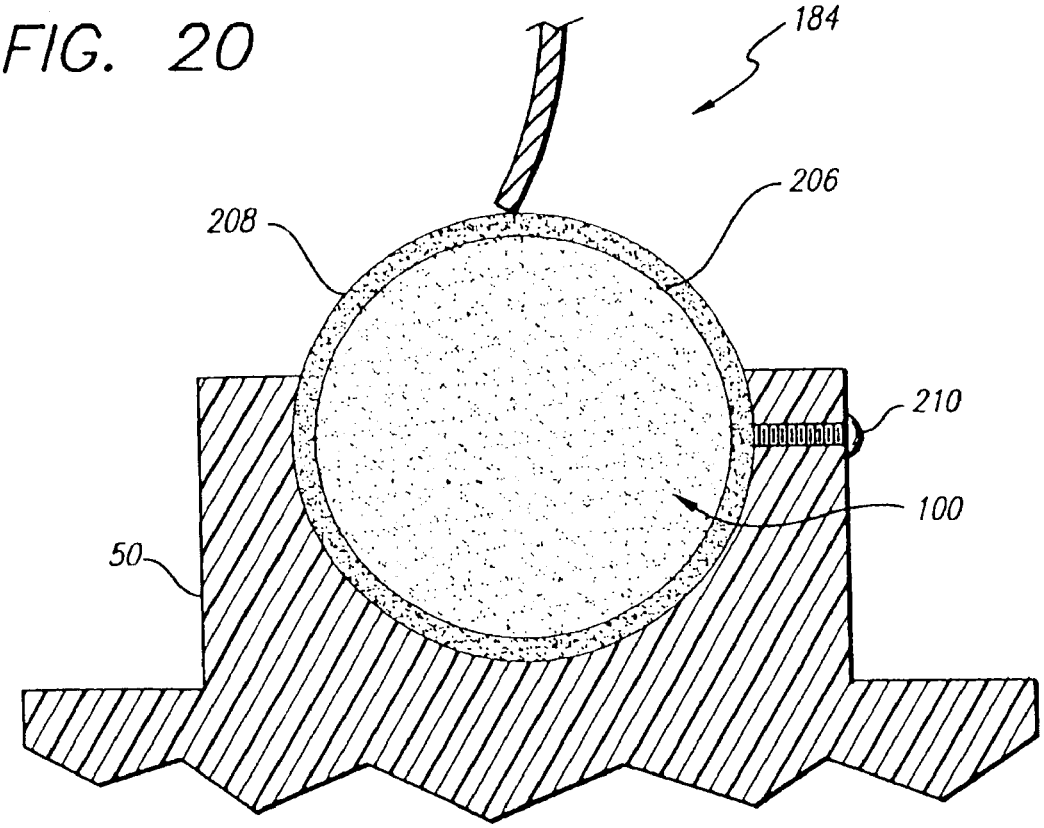
FIG. 20 is a sectional elevation view of a source of treatment fluid in a alternate embodiment of the invention.

Referring to FIG. 20, in another embodiment the fluid reservoir 100 comprises a porous media such as a fibrous bundle 206 impregnated with PEG contained within a porous sintered plastic cylindrical shell 208 supported by the service station 50. In this embodiment the cylinder formed of sintered plastic can be periodically rotated for example by contact of the wiper, or only as it becomes contaminated with ink. Alternatively the cylindrical reservoir can be held stationary, for example by a set screw 210 as shown or by mechanical interference, adhesive, or sonic welding. The fibrous bundle reservoir is formed of conventional materials, such as are readily commercially available and adapted to use in forming fluid reservoirs, for example in marker pens and the like. The fibers are bundled parallel within a sintered polymeric resin cylinder having pore size and wetting properties so as to provide a capillary gradient from the fibers inside tending to draw treatment fluid up into the cylinder and onto its outer surface.

Figure 21:
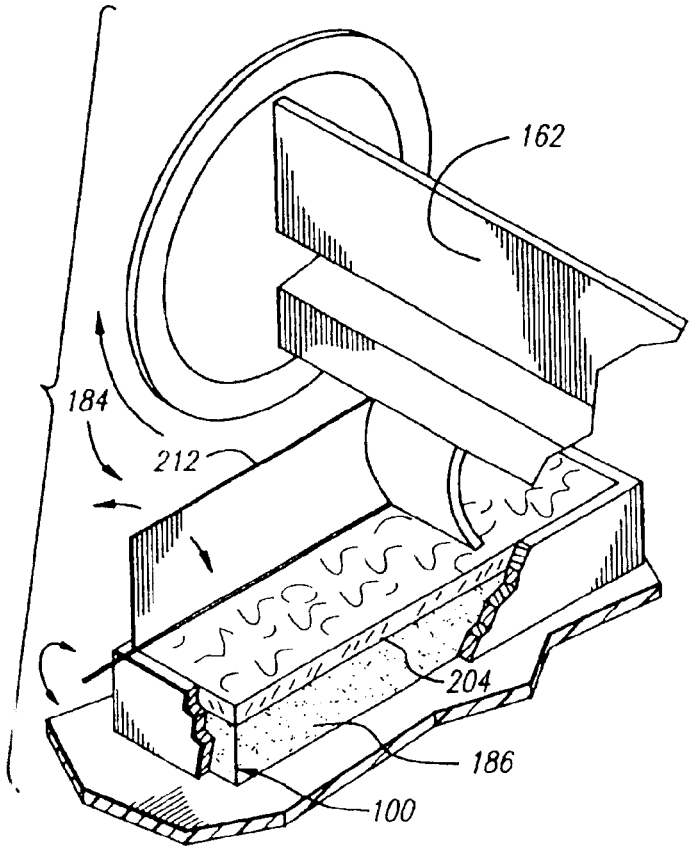
FIG. 21 is a perspective schematic representation, in partial-away, of an alternate embodiment of the invention.

In another embodiment, illustrated in FIG. 21, a layered foam reservoir 100 as described above is fitted with a remvoable protective cover. The cover comprises for example a flap 212, which closes onto the upper protective layer 204. This protective layer a layer of relatively hard foam as shown, or a plate with holes ablated or sintered therein as described above, to improve performance of the reservoir. The cover when closed provides a capillary space between the cover and protective layer which assists in wicking of the treatment fluid up and out of the upper layer surface 202 so as to be available to the wiper and also helps keep the upper surface clean by protecting it from ink and debris between pen servicing operations. This embodiment otherwise functions as before described in connection with layered reservoirs.

As can be appreciated, in each of the embodiments of FIGS. 18–21 the treatment fluid reservoir 100 also acts as an applicator, transferring treatment fluid to the wiper 70 when wipingly contacted thereby. This configuration gives advantages in simplicity of fabrication and reduced costs of manufacture.

With reference to FIG. 22, another way of metering treatment fluid dispensed is to actually control the amount of fluid available by direct mechanical means. In the embodiment shown this is accomplished by providing a stationary duckbill checkvalve applicator 132 carried by the service station 50 which is contacted by the wiper 70. The amount of treatment fluid made available to the wiper at an upper tip 214 of the applicator is metered by the action of a small volume syringe pump 216 controlled by the printer controller. As can be appreciated a controlled amount of treatment fluid is expelled from the duckbill applicator tip when fluid pressure exceeds a cracking pressure threshold of the applicator due to displacement of fluid for example by a small incremental movement of a syringe piston 218 of the pump fluidly connected thereto as shown. The piston can be actuated for example through a conventional screw drive activated by a stepper motor (not shown). Alternatively, a peristaltic pump or other finely controllable pump capable of administering fluid in volume increments of one to five microliters for example could be used. In the illustrated embodiment checkvalves 141, 142 are provided to allow the piston 218 to reset after each stroke, drawing treatment fluid from a collapsible treatment fluid reservoir 220 as shown. In an alternate embodiment the syringe pump is sized to accommodate a printer lifetime supply of treatment fluid. Such a pump could be actuated for example by a ratcheting drive mechanism coupled via a reduction gear set to the tumbler accordingly dispensing of the treatment fluid can be both activated by and coordinated with tumbler rotation in wiping.

Figure 23:
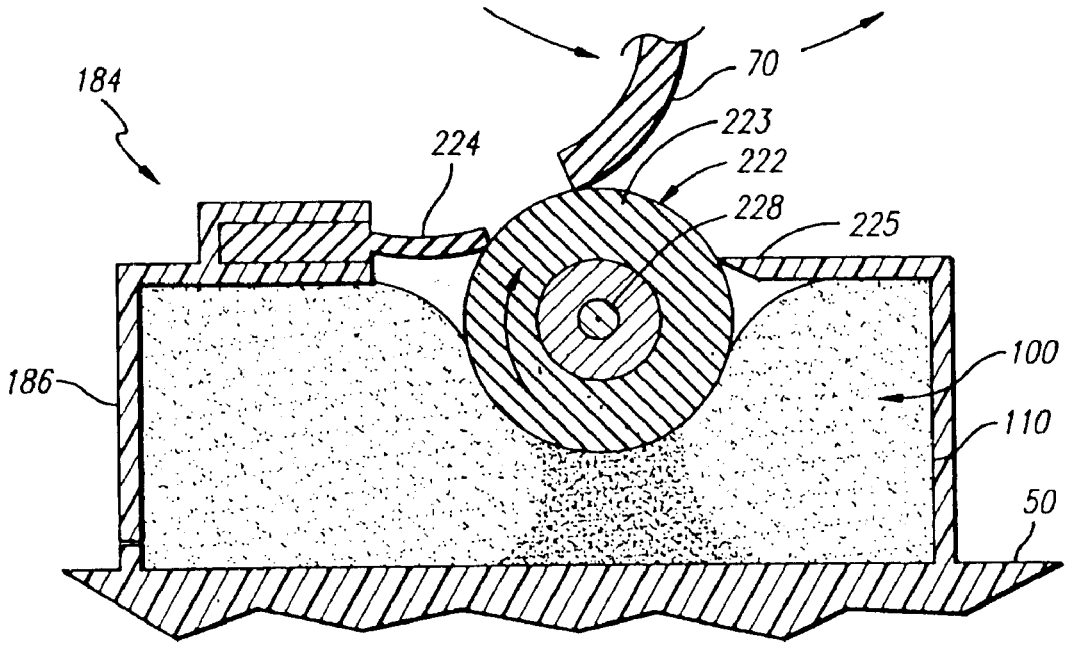
FIG. 23 is a sectional elevation view of a source of treatment fluid according to an alternate embodiment of the invention.

Referring to FIG. 23 in another embodiment the treatment fluid source 184 incorporates a transfer element 222, in this case an elastomeric transfer wheel roller rotatable about an axis parallel to that of the tumbler (perpendicular to the plane of the page in FIG. 23), to transfer treatment fluid from a treatment fluid reservoir 100 to the wiper 70. The roller must be as wide (in a direction perpendicular to the plane of the page in FIG. 23) as the portion of the wiper 70 to be wetted. The reservoir includes a porous media 110 to retain the treatment fluid in the reservoir without leaking as described above, and this material transfers treatment fluid to the transfer roller 222 in contact therewith as the roller rotates. Alternatively, a free fluid reservoir could be used, provided mitigation of leaking due to tipping of the printer or pressure changes is also provided as discussed elsewhere herein.

In operation, treatment fluid is brought upward from the reservoir 100 to be available to the wiper 70 by rotation of the transfer roller. This rotation can be solely by means of wiping contact of the wiper in one embodiment, which wiping contact rotates the transfer roller a part of one rotation at each pass and makes fresh treatment fluid available on its surface to be transferred to the wiper on the next pass. In another embodiment the roller is rotated by a drive motor (not shown) coupled thereto and rotation is controlled by the printer controller and coordinated with rotation of the wiper to dispense a small reproducible amount of treatment fluid to be transferred to the wiper 70 for wiping.

A cantilevered metering wiper 224 can be employed to further control the amount of treatment fluid on the roller surface to be picked up by the wiper 70, by wiping off excess treatment fluid. As will be appreciated the metering wiper, which is shown bending upward to contact the roller in FIG. 23, can instead be bent downward, facilitating easer assembly in manufacturing. A transfer wheel scraper 225 is provided, formed unitary with the containment 186, which acts to remove containments from the transfer wheel 222. These features combine to reduce contamination of the treatment fluid in the reservoir 100. The transfer wheel shown incorporates a layer 223 made of a solid elastomeric material. As will be appreciated the transfer wheel could also be formed of a foam material, or an elastomeric foam material with anon-porous outer surface if a softer non-porous wheel is desired.

Figure 24:
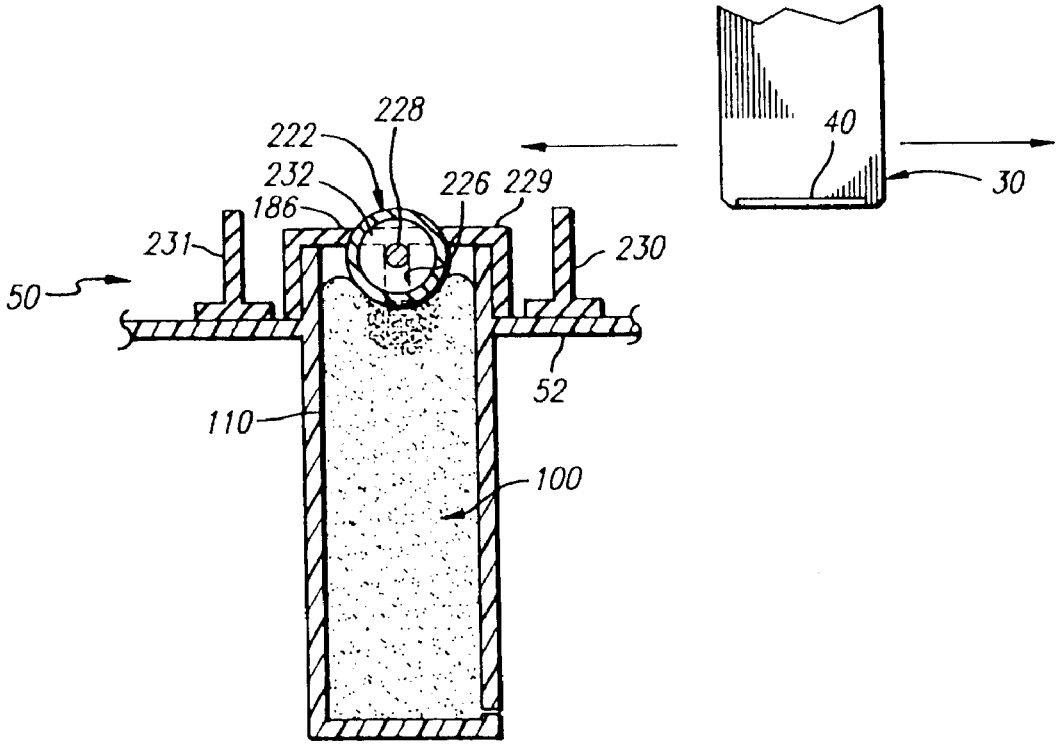
FIG 24 is a sectional view of source of treatment fluid in another alternate embodiment incorporated in a service station of the printer of FIG. 1.

With reference to FIG. 24 in another embodiment the transfer wheel roller 222 is configured to transfer treatment fluid directly to the printhead 30. The transfer wheel is mounted so that up-and-down movement is possible, in this embodiment provided by up and down movement of a sled 52 on which the wheel is mounted or by provision of a gimbal mount (not shown), or as shown by allowing movement of the wheel in the vertical direction by providing a slot in a containment 186 into which an axle 228 carrying the transfer wheel fits. The resilience of a treatment fluid saturated wicking block 110 formed of an elastomeric open-cell foam for example urges the transfer wheel element upward after being vertically depressed. A cap 229 defines an opening 232 configured to limit upward movement of the transfer wheel and allow a portion of the wheel to protrude so as to be available to contact the printhead 30. Also, the wheel or roller itself can incorporate a layer of foam or otherwise made compressible allowing some variation in the vertical extension of the transfer wheel 222.

In the illustrated embodiment of FIG. 24 the printhead 30 travels along its axis of motion towards a portion of the service station 50 where it is pre-wiped by a first wiper 230, then treatment fluid is applied to the orifice plate 40 as the printhead moves past the transfer wheel roller 222 in contact therewith, and a second wiper 231 wipes the printhead and removes excess treatment fluid and remaining accumulations of dried ink, etc. Alternatively, just one wiper can be provided. In the later case the printhead would be pre-wiped by one wiper 230, then contacts the transfer wheel roller 222, then reversing directions move towards and be again wiped by the same single wiper 230.

Figure 25:
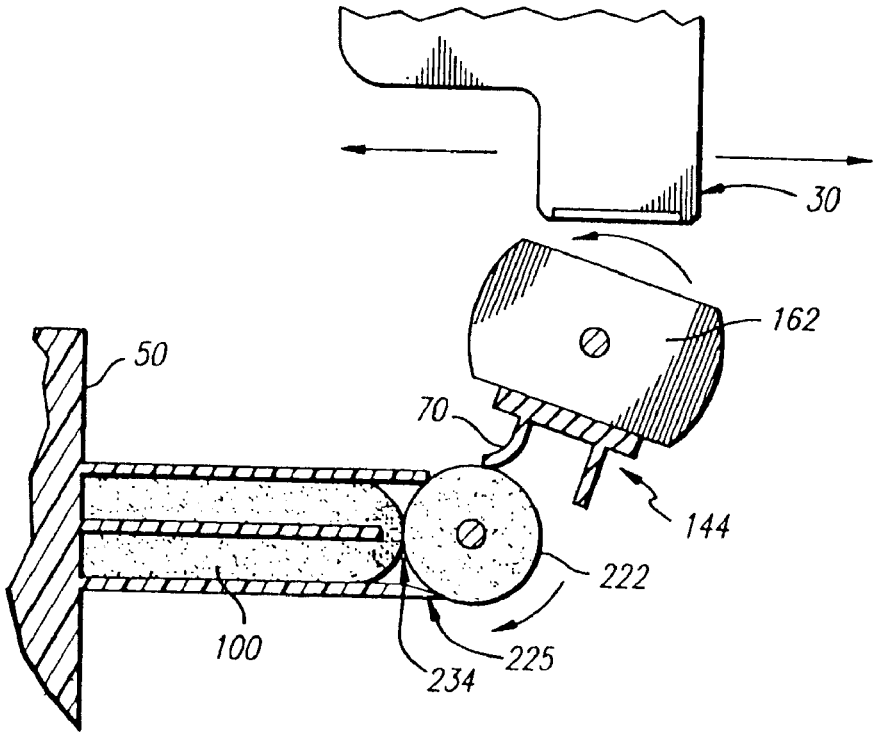
FIG. 25 is a sectional view of source of treatment fluid in another alternative embodiment incorporated in the printer of FIG. 15.

Referring to FIG. 25, in another embodiment the transfer wheel roller 222 is combined with a fluid reservoir 100 wherein a wicking block 110 of open-cell foam is doubled back and crimped somewhat at the location 24 of contact with the transfer roller. The reservoir is mounted on tie service station 50. As will be appreciated the pores of the material being compressed are smaller at the location of contact and higher attractive forces there tend to draw treatment fluid towards the location as discussed above to be available to the transfer roller. A tumbler 162 with a wiper set 144 provided to wipe the printhead 30 in operation contacts the transfer roller to transfer treatment fluid to each of the wipers 70 and also rotates the transfer roller to make treatment fluid available to the wiper at the next pass. Alternatively the roller can be driven by a separate drive motor as discussed above. A transfer roller scraper 225 is provided at the bottom of the transfer roller in this embodiment and excess fluid and debris removed from the transfer wheel by the scraper can fall away from the reservoir 100 reducing contamination thereof.

As mentioned, the embodiments shown in FIGS. 23, 24 and 25 can employ a solid or porous wheel roller 222. In another embodiment the transfer roller, if made of foamed material, could act as its own treatment fluid reservoir, having a printer lifetime supply of PEG for example contained therein.

Advantages obtained by use of a transfer wheel roller element 222 between the treatment fluid reservoir 100 and the wiper 70 include reducing contamination of the treatment fluid reservoir 100, and providing a metering function. For a given treatment fluid the amount transferred to the printhead 30 or wiper 70 can be varied for example by varying the roughness of the surface of the roller contacting the wiper or printhead 30, the wetting properties of materials used, for applied in contact of the wheel with other elements, and the use or not of a metering wiper 224 and the stiffness the metering wiper.

Figure 26:
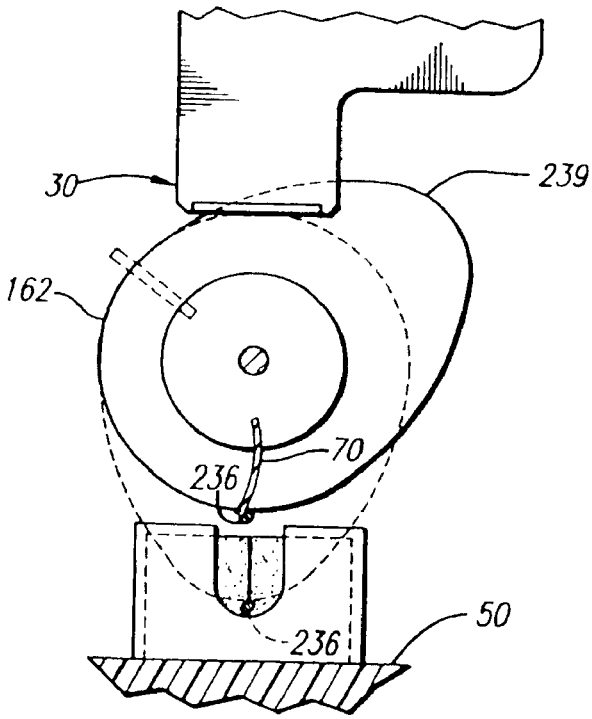
FIG. 26 is a schematic illustration, partially in section, of an alternate embodiment of the invention.

With reference to FIG. 26 in a further embodiment of the invention employing a transfer element for transferring treatment fluid from a fluid reservoir 100 to the wiper 70, a filament element 236, comprising either a single strand, such as a nylon wire for example, or a woven material such as a small diameter nylon rope for example, could be utilized as the transfer element. The filament is held taught and is pressed into a slit 238 in a PEG-saturated open-cell foam block 110 contained and supported by the service station 50, and then withdrawn, in this example by action of a cam 239. A spring (not shown) can be used to tension the filament and allow its displacement by the cam. Alternatively the filament could be placed in a spring-biased hinged frame (not shown) moved by the cam. The filament thus picks up a small reproducible amount of treatment fluid and the wiper 70 subsequently wipingly contacts the filament so that a small amount of treatment fluid is transferred to the wiper. This method of transferring and applying treatment fluid is advantageous in that the amount of fluid transferred is very controllable. As can be appreciated, the filament dosing method described could also be adapted to apply treatment fluid directly to the printhead.

Figure 27:
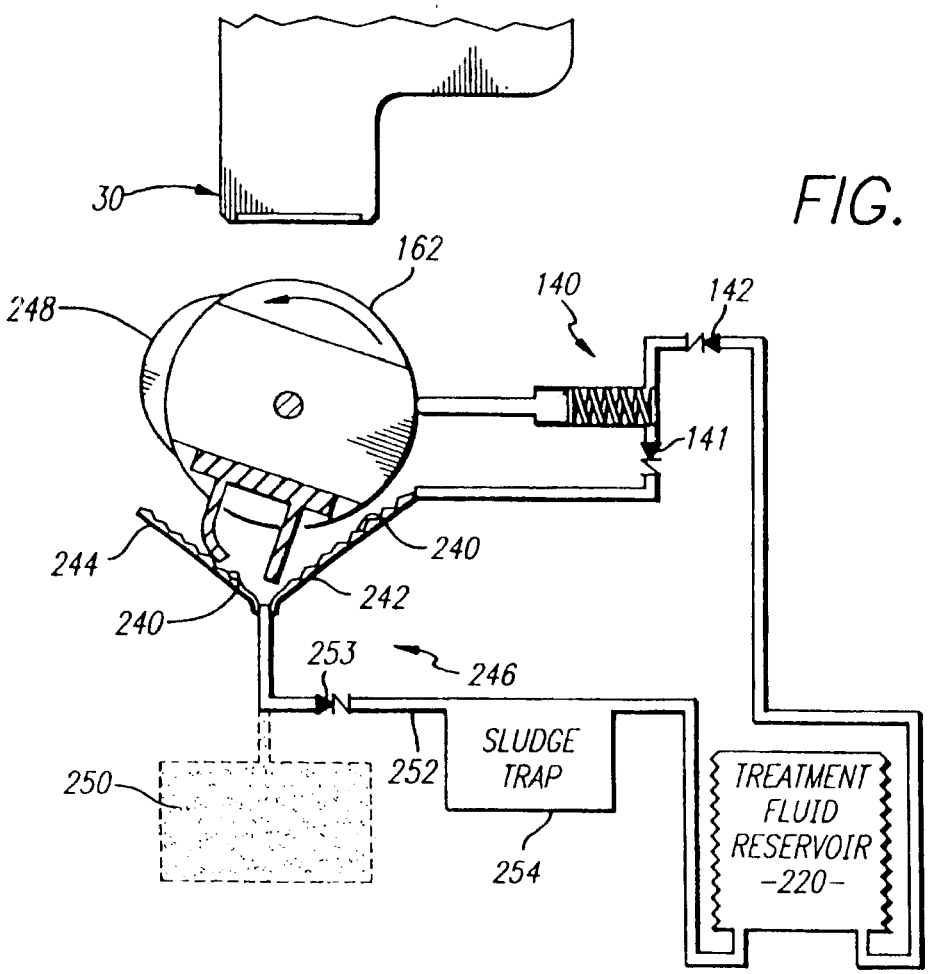
FIG. 27 is a schematic representation, partially in section, of an alternate embodiment of the invention.

Referring to FIG. 27 in another embodiment where the treatment fluid is transferred to the wiper, the functions of scraping the wiper 70 and transferring and applying treatment fluid are combined in a corrugated surface 240 on each of first and second inclined portions 242, 244 of the service station 50 together forming a path 246 comprising an applicator. Before wiping at least one surface 240 is wetted with treatment fluid, for example that corrugated surface associated with the first inclined portion 242. The parallel ridges and grooves forming the corrugations serve to clean the wiper as it passes, and ink and debris cleaned from the wiper are trapped in grooves between ridges of the corrugations. In one embodiment the corrugations are configured so that fluid can drain over the corrugations. In another embodiment the corrugations are configured so that fluid pools between corrugations an din the later case the corrugations can be inclined at an oblique angle to the direction of motion of the wiper so fluid can drain to one side. After the wiper passes, excess treatment fluid scraped from the wiper by the corrugations carries contaminants down to the bottom of the pan 246.

In the illustrated embodiment a piston pump 140, such as described above for example is actuated by a cam 248 incorporated in the tumbler 162 and pumps treatment fluid from a collapsible reservoir 220 onto the corrugated surface 240 of the first inclined portion 242. The pumping of fluid is thus controllable by the printer controller (not shown) by way of rotation of the cam of the tumbler 162 in either direction. Pumping is coordinated with wiping so that fluid is present on the corrugated surface of the first inclined portion when the wiper 70 wipingly contacts it.

The pan 246 can have a closed bottom (not shown) so that ink and debris collect and dry there, or could be plumbed to drain into an absorbent media 250 for example. In another embodiment the pan is plumbed for recycling of the treatment fluid, for example by providing a flow-backchecked drain conduit 252 connected to a sludge trap 254 and the reservoir 220. As can be appreciated, the reservoir in this embodiment is located at a lower elevation than the pan. A further checkvalve 253 is provided to prevent retrograde flow of treatment fluid back into the pan 246.

Figure 28:
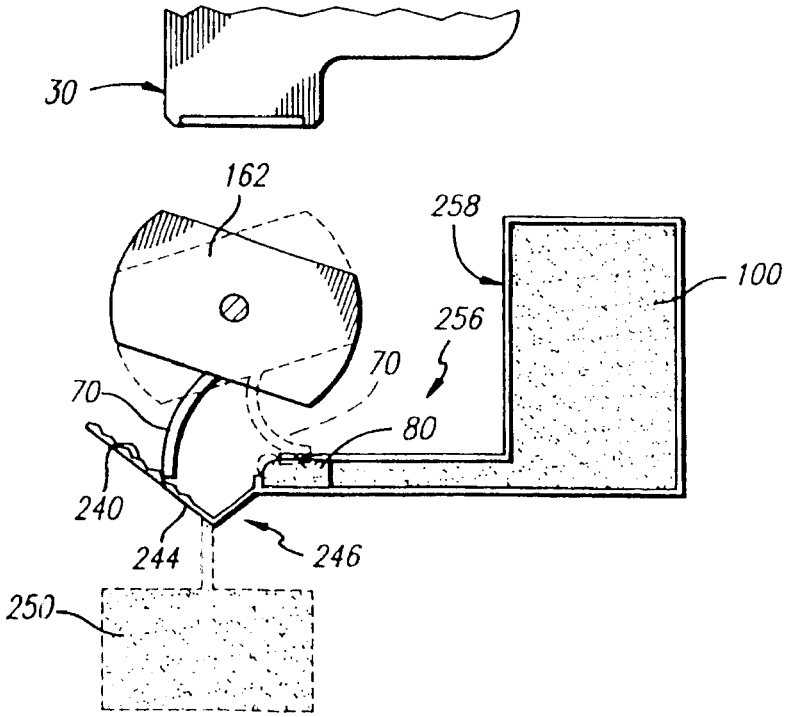
FIG. 28 is a schematic representation, partially in section, of an alternate embodiment of the invention.

With reference to FIG. 28, an another embodiment a fluid reservoir 100 filled with a porous media as described above is located adjacent the pan 246. A deformable portion 256 of a containment 258 is contacted and squeezed by the wiper 70 as the wiper passes by, providing a pumping action pushing fluid out of the reservoir. The pumping action makes treatment fluid available to the wiper at an opening 260 in the containment located so as to be swept by the wiper. A deformable wicking applicator 80 such as described above can be placed in the opening to contact the wiper. Otherwise operation of this embodiment is as discussed above. In an alternate embodiment a deformable tube segment (not shown) could be substituted for the deformable portion 256, the wiper or another element (not shown) carried by the tumbler acting to pump fluid therethrough by deforming contact with the deformable tube segment tending to sweep treatment fluid in the segment in the direction of wiper movement.

Figure 29:
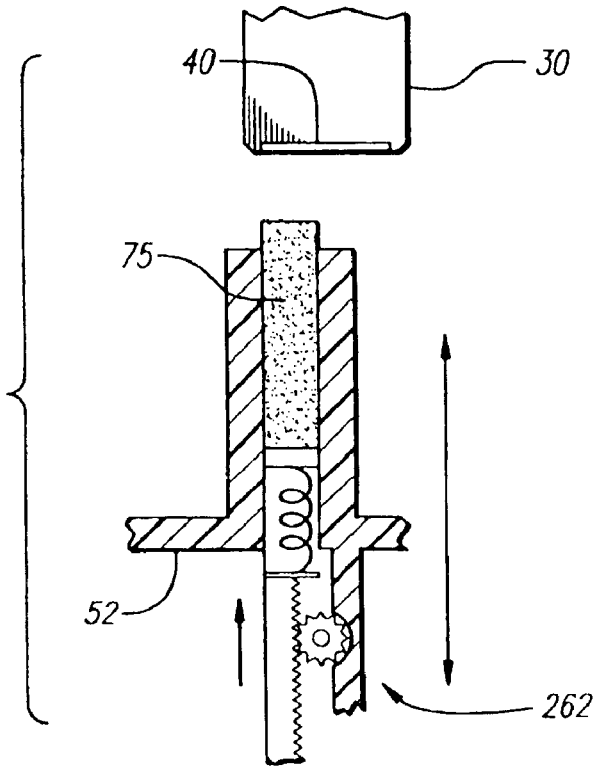
FIG. 29 is a schematic representation, partially in section, of an alternate embodiment of the invention incorporated in the printer of FIG. 1.
Figure 30:
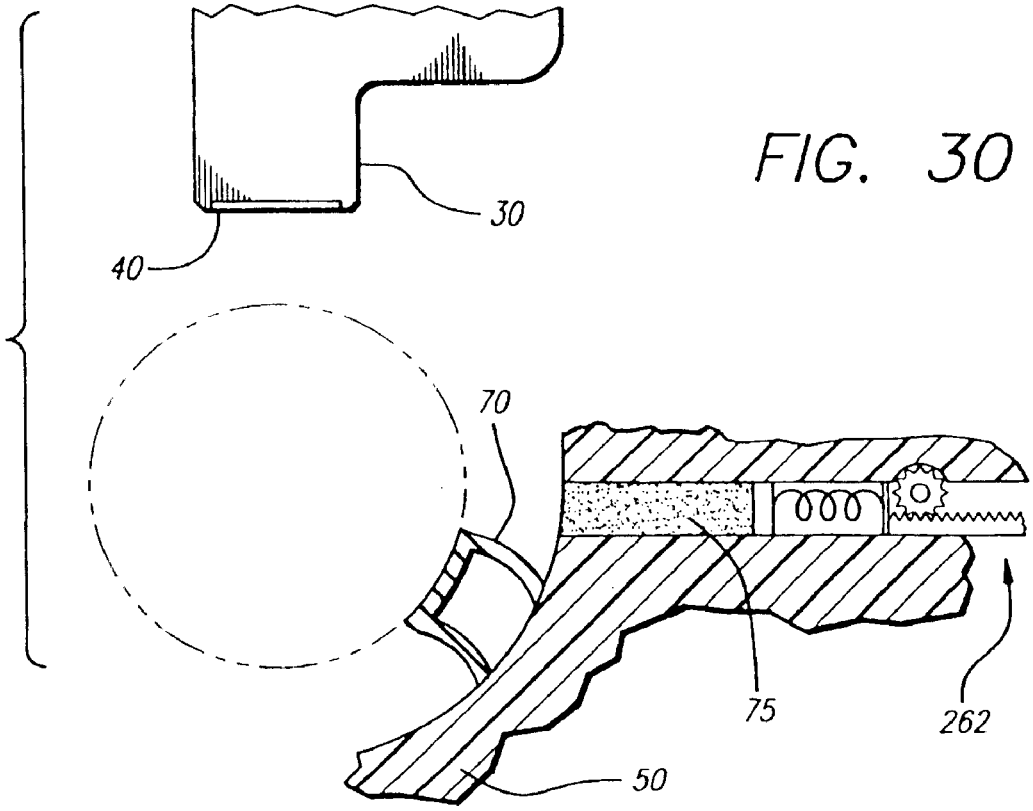
FIG. 30 is a schematic representation, partially in section, of an alternate embodiment of the invention incorporated in the printer of FIG. 15.

With reference to FIGS. 29 and 30 in a further embodiment of the invention a treatment fluid 75 is chosen so as to be in a non-flowable state at ambient temperature, taking into account a range of temperatures anticipated to be encountered during shipment and use of a printer 10 incorporating the wet-wiping system of the present invention. The treatment fluid is heated so that it melts to a fluid state for printhead servicing. The treatment fluid used in this embodiment is a high molecular weight PEG, e.g., PEG 1000 or above, stored in solid form. This treatment fluid material at room temperature is a solid waxy material. It has been found that mixing PEGs of different molecular weights allows customization of the melting point and hardness properties of the material at various temperatures as desired. It has been found that a PEG of 1450 molecular weight works well in this application. This embodiment has particular advantage in storage and transport of the printer 10, and can be combined with other features herein described to optimize performance and minimize problems associated with tipping and pressure differences noted. For example, the PEG treatment fluid 75 can be kept in a solid form unless the printer is upright in normal use.

In another embodiment the treatment fluid 75 can comprise a treatment fluid, such as PEG of lower molecular weight for example, liquid at ambient temperature, micro-encapsulated and dispersed within a wax or wax-like material which is solid at ambient temperature. When melted, such a material release the treatment fluid. Moreover, in another embodiment the wax-like material can be a high molecular weight PEG and the encapsulated liquid can be another treatment fluid, for example one which has low solubility in PEG, and this other treatment fluid is dispersed and entrained in liquid PEG at an elevated temperature, for example by high-shear mixing. After cooling the mix the liquid treatment fluid is micro-encapsulated in a solid PEG matrix.

Heating the treatment fluid to liquify it before use in servicing a printhead 30 can be done in a number of ways. In one embodiment illustrated by FIG. 29 the solid treatment fluid is liquified by contacting a block of the solid treatment fluid 75 directly to a heated orifice plate 40 prior to wiping. A small reproducible amount of treatment fluid melts and is deposited on the orifice plate. As mentioned above the contact is located adjacent a side of the printhead 30 so that the wiper (not shown) will first contact the treatment fluid, then wipe across the orifice plate. As shown schematically, the block of solid treatment fluid 75 is spring-mounted with respect to a vertically movable sled 52 for example to provide a relatively constant contact pressure, and a rachet 262 can be provided to compensate for reduction in length of the block as treatment fluid is melted off over the printer life. For example in one embodiment (not shown) a drive shaft from a drive motor actuating the tumbler is coupled by a set of reducing gears to a ratchet so that the block of solid treatment fluid is indexed toward the wiper.

Alternatively, as illustrated in FIG. 30 a block of solid treatment fluid 75 supported by the service station 50 is contacted by a wiper 70 or another transfer element. Some solidified treatment fluid is scraped off onto the wiper for example, and transferred to the heated orifice plate 40 where it melts due to the elevated temperature of the orifice plate. Treatment fluid is then available and pushed ahead of the wiper to assist in wiping as before described. Provision for a relatively constant contact pressure between the wiper and the block of solid treatment fluid is provided by spring-mounting the block and providing a ratchet 262 in this embodiment as well.

In another embodiment shown in FIG. 31 the solid treatment fluid 75 is stored in a reservoir 100 incorporating a heating element 264 connected to a power source 266 controlled by the printer controller 94. The heater heats and melts the treatment fluid appropriate times in response to signals from the printer controller. The reservoir incorporates a transfer element 222 in the form of a roller formed of an elastomeric material. The roller material can be solid or porous depending upon the specific application. The roller protrudes from a containment 186 carried by a service station sled 52 for example which can be moved up and down as desired to bring the transfer roller to a position interfering with the motion of travel of a printhead 30 to contact the printhead orifice plate 40 as before described. As can be appreciated the reservoir is a free fluid reservoir when the heated treatment fluid is in liquid state and treatment fluid is transferred to the orifice plate by the roller as before described. After application of treatment fluid to the printhead orifice plate it is wiped, for example by a set of wipers 144 positioned nearby. A metering wiper 224 and a transfer wheel scraper 225 function as described above and also assist in contacting treatment fluid within the free-fluid reservoir when in a liquid state. The transfer wheel could be rotated by a drive motor (not shown) or be turned by the wiping contact of the printhead 30 in this embodiment in incremental partial rotation as heretofore described.

As shown in FIG. 32, in another embodiment a fluid reservoir 100, similar to that described in connection with FIG. 31 containing a high molecular weight PEG and a heater, is positioned in a service station 50 so as to be wiped by a tumbler-mounted wiper 70 which subsequently wipes a printhead 30, rather than contact the printhead directly as in the embodiment of FIG. 31.

Figure 33:
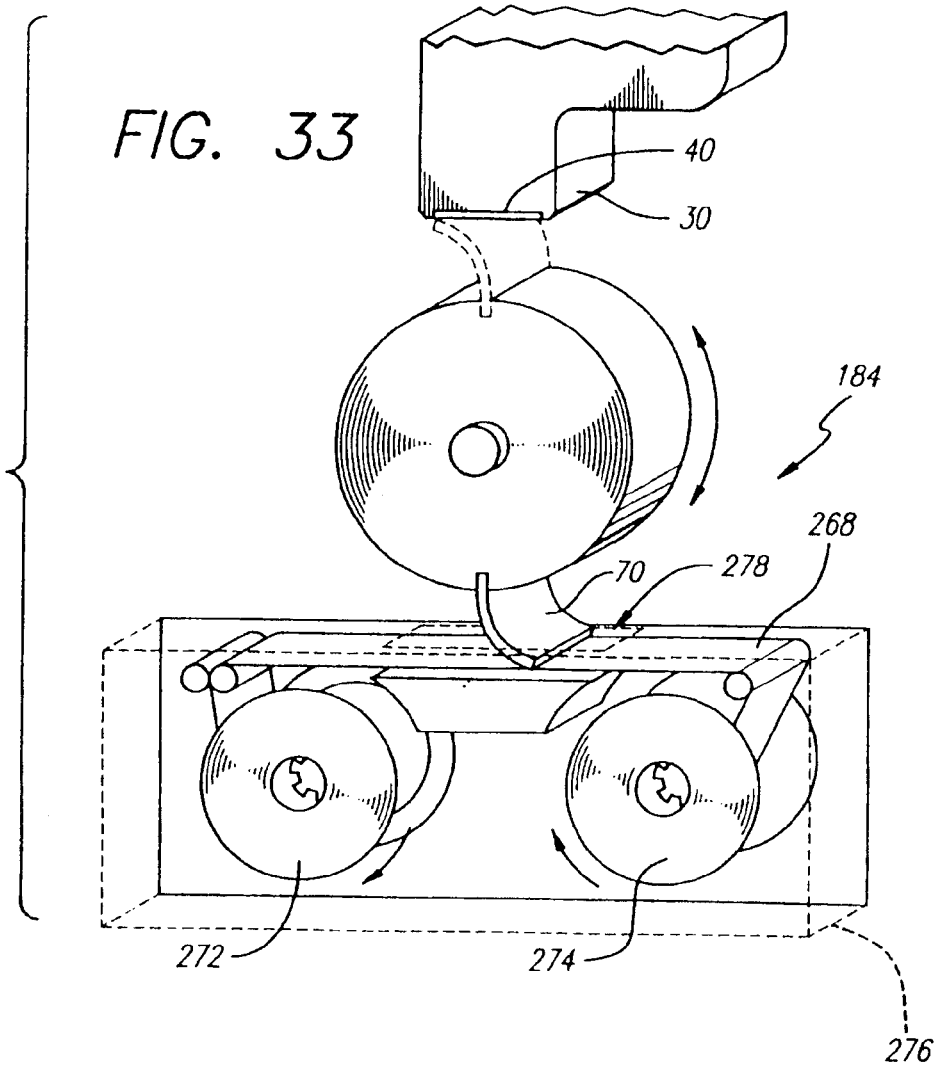
FIG. 33 is a schematic perspective illustration of the alternate embodiment of the invention.
Figure 34:
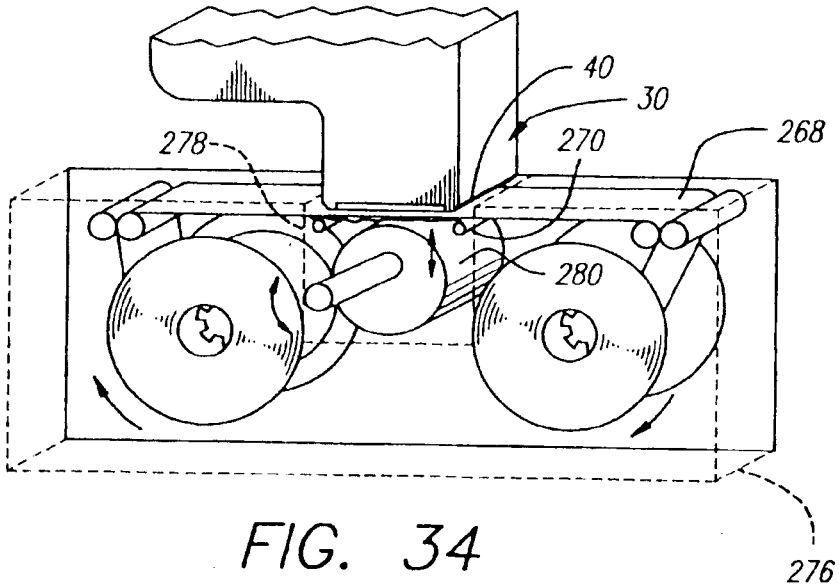
FIG. 34 is a schematic perspective illustration of the alternate embodiment of the invention.

In further embodiments shown in FIGS. 33, 34, and 35 a treatment fluid-carrying tape is used to apply treatment fluid to the printhead 30 or wiper 70. With reference to FIG. 33 in one embodiment the source 184 of treatment fluid used in wiping the printhead orifice plate 40 of the printhead 30 comprises a roll of treatment fluid impregnated lint-free fabric layer 268 which tape is advanced as required to make fresh treatment fluid available to the wiper 70 which first contacts the tape and subsequently wipes the printhead. The treatment fluid carried by the tape could be PEG in a liquid or solid form. The tape is conventionally wound on a supply reel 272 and a take-up reel 274 which are incrementally turned as directed by the printer controller (not shown). As can be appreciated the tape 268 can be stored in a cassette 276 having a window 278 allowing access to the tape by the wiper, and such a cassette could be replaceable. The tape in one embodiment is formed of a lint-free cloth such as described below, but could be formed of other materials, for example a flexible tape having a roughened surface adapted to retain treatment fluid thereon.

In another embodiment shown in FIG. 34 a fabric tape 268 could be made to contact the printhead 30 directly for cleaning. In this embodiment the fabric tape itself assists in cleaning as it is moved over the orifice plate 40, and as can be appreciated the texture of the fabric is chosen to increase cleaning effectiveness. In one embodiment lint-free ribbon material such as that used to sore ink in dot-matrix printers and typewriters for example, and known in the art is employed. In another embodiment a lint-free cotton material such as TX 309 TEXWIPE or the equivalent is used. TEXWIPE is a trademark used by Texwipe Incorporated of Upper Saddle River, New Jersey. A padded pressure plate 270, vertically actuated by means of a cam 280 for example, can be used to bring the fabric tape into contact with the orifice plate. Again the tape could be contained in a replaceable cassette 276 having a tape access window 278.

With reference to FIG. 35 in another embodiment a continuous lop of a lint-free fabric tape 268 such as described above is used to apply treatment fluid to the orifice plate 40 of a printhead 30, and again performs a cleaning function in addition to transferring treatment fluid to the printhead. In this embodiment the fabric loop is disposed on rollers 281 supported by the service station 50 and driven by a transfer wheel roller 222 turned by a shaft 282 coupled to a drive motor (not shown) controlled by the printer controller. The transfer wheel is in a treatment fluid bath 284, comprising for example a high molecular weight PEG which is heated for use, but otherwise is in solid form preventing leakage from tipping etc. As will be apparent, the transfer wheel could alternatively be wetted as described above in connection with FIGS. 23, 24, 25, or 31 for example. Returning to FIG. 35 a padded pressure plate 270 is vertically movable by a hydraulic actuator 286 to bring the fabric tape into and out of contact with the orifice plate. To accommodate vertical deflection of the fabric tape, and maintain a constant tension on the fabric tape, a spring-biased tensioner 288 is conventionally provided.

Turning now to FIGS. 36–39, in a further embodiment of the invention a metered amount of treatment fluid 74 is applied directly to the printhead 30 by throwing or projecting it through the air from a projecting means onto the orifice plate 40. An advantage of such a system is that the source of treatment fluid is not contaminated by contact with a wiper 70 or the printhead.

Referring to FIG. 36, in one embodiment a low-volume mechanical spray pump 290 carried by the service station 50 is actuated, for example by a cam or solenoid (not shown), to spray a metered dose of one to five microliters of treatment fluid onto the orifice plate as it passes by or is stationed over a sprayhead 292 of the pump. Treatment fluid is stored in a collapsible fluid reservoir 220 fluidly connected to the pump via a fluid conduit 152 in this embodiment. The treatment fluid is PEG of molecular weight 200–600 in this embodiment.

With reference to FIG. 37, in another embodiment the treatment fluid 74 is thrown or projected onto the printhead by a thermal jetting process in the same way as ink is projected in well-understood thermal inkjet processes used in printing. An inkjet-like cartridge 294 having a collapsible treatment fluid reservoir 296 and a conventional thermal printhead 298 connected to a power supply 300 is positioned, for example on a service station sled 52, so as to be able to project treatment fluid onto the pen printhead as desired, the jetting of treatment fluid being controlled by the printer controller 94 and coordinated with the motion of the printhead 30 passing by or stationed over the treatment fluid-projecting printhead 298. The cartridge is filled with a jettable treatment fluid, for example one-half PEG of between 200 and 600 molecular weight, and one-half water. As can be appreciated, a piezo-electric ink jetting cartridge, also otherwise conventional, can be used instead of a thermal system. An advantage of this embodiment is that treatment fluid can be metered, for example by counting drops ejected as is known in the art to provide an optimal dose of treatment fluid.

Figure 39:
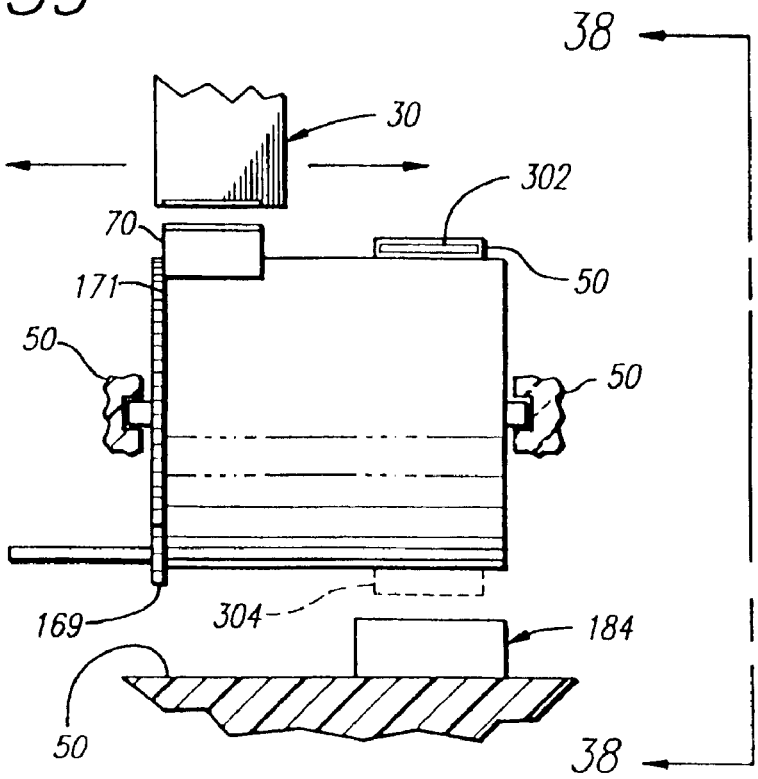
FIG. 39 is an elevational schematic illustration partially in section, of the alternate embodiment of FIG. 38 taken from direction line 39—39 in FIG. 38.

Turning to FIGS. 38 and 39 in another embodiment of the invention the treatment fluid 74 is thrown or projected toward the printhead 30 by a spring steel "flipper" 302 cantilever-mounted on the service station 50 adjacent a tumbler 162 having a relatively stiff transfer wiper 304 mounted thereon. A treatment fluid source 184, for example comprising a mesh-covered foam reservoir 100 as described above, is positioned to be contacted by the transfer wiper as the tumbler is rotated. Other reservoir embodiments described herein could be substituted for the mesh-covered foam reservoir shown. As the tumbler 162 is rotated a small reproducible quantity of treatment fluid is picked up by the transfer wiper 304 as it wipes the mesh-covered foam treatment fluid reservoir 100. This quantity of treatment fluid is transferred to the spring steel flipper 302 as the transfer wiper rotates around and contacts the flipper. The flipper is elastically deflected downwardly, and scrapes the tumbler mounted transfer wiper clean of treatment fluid as the transfer wiper continues to rotate past. As can be appreciated, when the transfer wiper clears the flipper the flipper is released and rebounds upwardly, flinging a reproducible portion of the treatment fluid upward and onto a printhead 30 to be serviced, the printhead being positioned at a first position above the flipper for this purpose.

After the treatment fluid 74 has been thrown onto the printhead 30 the printhead is moved along its axis of travel to a second position to be wiped by an offset tumbler-mounted wiper 70. This is best appreciated with reference to FIG. 39.

With reference to FIG. 40, in another embodiment the spray pump, treatment fluid jet, or flipper described above can be used to apply treatment fluid to the wiper instead of the printhead directly. As an example, a service station-mounted PEG-jetting cartridge 294 as described above and controlled by the printer controller 94 is configured to spray treatment fluid onto a wiper 70 prior to wiping the orifice plate 40. The advantages with regard to metering treatment fluid amounts, and preservation of the cleanliness of the source of treatment fluid are obtained in this embodiment as well. As can be appreciated a separate service station-mounted scraper 170 as described above can be provided.

With reference to all the embodiments described herein the application of a treatment fluid in the printhead wiping process add one more parameter (the treatment fluid itself) that can be varied to keep the printhead 30 clean, resulting in better print quality over the life of the printer 10, and lower operating costs and reduction of wasted resources due to improper printhead function attributable to inadequate cleaning, particularly where pigment-based, quick drying and waterfast inks are employed. By machining the chemical and physical characteristics of the ink, orifice plate surface 40 and wiper 70 with a complementary treatment fluid, optimization of pen cleanliness, wiper life and servicing speed is possible. These considerations are especially important if a given printhead is used for a long period of time. Moreover, the results of the invention can be obtained using configurations that are maintenance-free throughout the life of the printer 10. These considerations result in overall improved performance at tow additional cost to purchasers.

Persons skilled in the art will readily appreciate that various modifications can be made from the presently preferred embodiments of the invention disclosed herein and that the scope of protection is intended to be defined only by the limitations of the appended claims.

We claim:

1. A method of servicing an inkjet printer printhead comprising [the steps of]:

[providing a wiper mounted for movement with respect to the inkjet printer printhead in wiping contact therewith to remove unwanted accumulation from the printhead;

providing a source of printhead servicing fluid;

providing another inkjet printhead as a non-contact servicing fluid applicator and orienting said applicator to jet servicing fluid in a reproducible quantity onto a surface of the printhead of said inkjet printer and the wiper;

transporting servicing fluid from said source to said applicator;]

jetting *a reproducible quantity of* servicing fluid from [said] *an inkjet printhead used as a servicing fluid* applicator through atmosphere onto *at least one of* the printhead of said inkjet printer and [the] *a printhead* wiper; [and]

[wiping] *contacting* the printhead of the inkjet printer [by moving] *with the wiper during relative movement of* the wiper [with respect to] *and* the printhead [of the inkjet printer] to remove unwanted accumulation therefrom;

[vaporizing said servicing fluid to jet ejecting said fluid from said applicator printhead; and said servicing fluid being projected from said applicator printhead onto the printhead and said wiper; and]*;* counting drops of servicing fluid ejected from said applicator [head]; and controlling the amount of servicing fluid applied to the printhead based on the counted number of drops.

2. The method of claim 1, further comprising [the steps of]:

maintaining [said] *a* source of servicing fluid in an uncontaminated state by preventing contact between said source of servicing fluid and said wiper.

3. A method of [servicing] *applying servicing fluid to* a printhead of an inkjet [printer] *printing mechanism* comprising [the steps of]:

[providing a wiper mounted for movement with respect to the printhead to facilitate removing unwanted accumulations from the printhead;

providing a source of printhead servicing fluids;

providing a non-contact applicator and orienting said applicator to project servicing fluid in a reproducible quantity onto a surface of at least one element selected from a group consisting of two elements, the printhead and the wiper through surrounding atmosphere;]

transporting servicing fluid from [said] *a* source to [said] *a non-contact* applicator *comprising a resilient spring*;

projecting the servicing fluid through [the] atmosphere *from said spring* onto [said] at least one [element] *of said printhead and a printhead wiper*; and wiping the printhead [by moving the wiper with respect to the] *during relative movement of said wiper and* printhead to remove unwanted accumulations from the printhead, [said non-contact applicator comprising a spring; and] said servicing fluid being projected by[:] deforming said applicator spring[;] and releasing said applicator spring to project servicing fluid from said spring onto said printhead by rebound of said spring.

4. A system for servicing an inkjet printer having a printhead reciprocally moved by a carriage and a wiper positioned to move with respect to the printhead in wiping contact therewith to remove unwanted accumulations, comprising:

a source of printhead servicing fluid;

a servicing fluid applicator for projecting servicing fluid through [the] atmosphere onto *at least one of* the printhead and wiper; and means for transferring servicing fluid from said source of servicing fluid to said applicator, wherein said applicator comprises an elastically deformable spring for impelling [treatment] *servicing* fluid toward at least one of the printhead and wiper.

5. A [system] *method* according to claim [4] *15*, wherein said [applicator] *second printhead* is oriented to project a precisely controllable amount of servicing fluid through atmosphere onto a selected area on the printhead of said inkjet [printer and said wiper] *the first printhead*; and [wherein said means for transferring servicing fluid includes:

control means for] counting drops of servicing fluid propelled from said [applicator] *second printhead* to [help] facilitate controlling the amount of servicing fluid applied to the [inkjet printer] *first printhead* based on [the counted number] of drops.

6. The [system] *method* of claim [4] *5*, wherein said [applicator head includes] *second printhead is* a thermal inkjet head [in fluid communication with said source].

[7. The system of claim 6, further comprising a counter coupled to said applicator head for counting drops of servicing fluid ejected therefrom to control the amount of servicing fluid applied to the printhead.]

8. The system of claim 4, wherein said spring is cantilever-mounted [and positioned to throw treatment onto said at least one element].

9. The system of claim 8, further comprising a transfer wiper for placing servicing fluid from said source onto said spring by wiping contact, said transfer wiper being positioned to elastically bend said spring away from said [at least one] printhead [and wiper element] and then release said spring.

[10. A system according to claim 4, wherein said applicator includes:

a cartridge for storing said reservoir of treatment fluid; and said applicator head being in fluid communication with said cartridge for jetting a desired volume of said treatment fluid onto said printhead orifice plate to facilitate an improved wiping action.]

11. A [system] *method* according to claim [10] *16*, wherein said [cartridge] *second printhead* is a refillable cartridge.

12. A [system] *method* according to claim [10] *11*, wherein said applicator [head] *second printhead* is a thermal fluid jetting printhead.

13. A [system] *method* according to claim [10] *11*, wherein said applicator [head] *second printhead* is a piezoelectric fluid jetting printhead.

14. A method of servicing a portion of a printhead of an inkjet printer comprising the steps of:

providing a wiper mounted for movement with respect to the printhead in wiping contact therewith to remove unwanted accumulation from a portion of the printhead;

providing a source of printhead servicing fluid;

providing another inkjet printhead as a non-contact servicing fluid applicator and orienting said applicator to jet servicing fluid in a reproducible quantity onto a surface of the printhead of said inkjet printer and the wiper;

transporting servicing fluid from said source to said applicator;

jetting service fluid from said applicator through atmosphere onto the printhead of said inkjet printer and the wiper; and wiping the printhead of the inkjet printer by moving the wiper with respect to the printhead to remove unwanted accumulation therefrom; and further comprising the steps of:

vaporizing said servicing fluid to jet ejectingly said fluid from said applicator printhead; and said servicing fluid being projected from said applicator printhead onto the printhead and said wiper.

*15. A method of servicing a first inkjet printhead comprising:*

*using a second printhead to project a reproducible quantity of servicing fluid through atmosphere onto said first printhead; and*

*wiping said first printhead to remove unwanted accumulation.*

*16. The method of claim 15, comprising thermally projecting said servicing fluid.*

*17. The method of claim 15, comprising piezo-electrically projecting said servicing fluid.*

*18. A system for servicing a printer having a carriage mounted inkjet printhead on a reciprocally movable carriage and a wiper positioned to wipe the carriage mounted printhead to remove unwanted accumulations from the printhead, a source of printhead servicing fluid, a non-contact service fluid applicator in fluid communication with said source, said non-contact applicator comprising a second inkjet printhead oriented to eject servicing fluid in a reproducible quantity onto a surface of said carriage mounted printhead.*

*19. A method of servicing a portion of a scanning printhead of an inkjet printer which includes a printhead wiper comprising:*

*projecting a reproducible quantity of servicing fluid from an applicator pump through atmosphere onto at least one of said printhead and said wiper; and*

*wiping said printhead by moving said wiper with respect to said printhead to remove unwanted accumulations from said printhead.*

*20. The method of claim 19, further comprising maintaining a source of servicing fluid in an uncontaminated state by preventing contact of said applicator with said printhead and said wiper.*

*21. A system for servicing a portion of a printhead of an inkjet printer having a printhead reciprocally moved by a carriage and a wiper positioned and adapted to move with respect to the printhead in wiping contact therewith to remove unwanted accumulations from a portion of the printhead, comprising:*

*a source of printhead servicing fluid;*

*a servicing fluid applicator comprising a pump having an outlet for projecting a reproducible quantity of servicing fluid through atmosphere onto at least one of said printhead and said wiper; and*

*means for transferring servicing fluid from said source of servicing fluid to said servicing fluid applicator.*

*22. The system of claim 21, wherein said applicator projects a metered amount of servicing fluid applied onto at least one of said wiper and said printhead.*

*23. The system of claim 22, wherein said pump is a low volume spray pump.*

*24. The system of claim 21, wherein said source of servicing fluid comprises a collapsible reservoir.*

* * * * *